US012563424B2

(12) United States Patent (10) Patent No.: US 12,563,424 B2

Zhang (45) Date of Patent: Feb. 24, 2026

(54) METHOD AND DEVICE FOR DISCONTINUOUS WIRELESS COMMUNICATION

(71) Applicant: Apogee Networks, LLC, Plano, TX (US)

(72) Inventor: Xiaobo Zhang, Shanghai (CN)

(73) Assignee: Apogee Networks, LLC, Plano, TX (US)

( * ) Notice: Subject to any disclaimer, the term of this patent is extended or adjusted under 35 U.S.C. 154(b) by 708 days.

(21) Appl. No.: 17/945,997

(22) Filed: Sep. 15, 2022

(65) Prior Publication Data

US 2023/0014893 A1 Jan. 19, 2023

Related U.S. Application Data

(63) Continuation of application No. PCT/CN2021/080944, filed on Mar. 16, 2021.

(30) Foreign Application Priority Data

Mar. 18, 2020 (CN) .......................... 202010189423.8

(51) Int. Cl.
| | |
|---|---|
| *H04W 24/08* | (2009.01) |
| *H04W 72/02* | (2009.01) |
| *H04W 72/0446* | (2023.01) |

(52) U.S. Cl.
CPC .......... *H04W 24/08* (2013.01); *H04W 72/02* (2013.01); *H04W 72/0446* (2013.01)

(58) Field of Classification Search
CPC . H04W 72/044; H04W 74/002; H04W 76/28; H04W 72/0446; H04W 72/20; H04W 74/04
See application file for complete search history.

(56) References Cited

U.S. PATENT DOCUMENTS

| | | | |
|---|---|---|---|
| 2016/0330791 A1 | 11/2016 | Vajapeyam | |
| 2019/0158229 A1* | 5/2019 | Wei ........................ | H04L 1/1848 |

(Continued)

FOREIGN PATENT DOCUMENTS

| | | |
|---|---|---|
| CN | 102595440 A | 7/2012 |
| CN | 105052242 A | 11/2015 |

(Continued)

OTHER PUBLICATIONS

Supplementary European search report and European opinion on EP21772089.5 received dated Aug. 3, 2023.

(Continued)

*Primary Examiner* — Romani Ohri
(74) *Attorney, Agent, or Firm* — Volpe Koenig

(57) ABSTRACT

A method and device for discontinuous wireless communications. A first receiver receives a first information set, the first information set indicates a first expiration value; a first processor starts a first timer at a first time in a first time period; when the first timer is running, updates the first timer in each first time interval in the first time period and monitors a first-type target signaling in each first candidate slot in the first time period; when the first timer expires, stops the first timer; herein, the first time period is a time period in a first super time period; a position of the first time in the first time period is related to a position of the first time period in the first super time period. The present application can achieve the benefit of power saving and improve the success rate of receiving periodic services.

18 Claims, 8 Drawing Sheets

(56)                    References Cited

U.S. PATENT DOCUMENTS

| | | | |
|---|---|---|---|
| 2020/0037354 A1* | 1/2020 | Li | ..................... H04W 74/0808 |
| 2020/0053825 A1 | 2/2020 | Hwang et al. | |

FOREIGN PATENT DOCUMENTS

| | | | | |
|---|---|---|---|---|
| CN | 110798887 A | 2/2020 | | |
| WO | 2019030871 A1 | 2/2019 | | |
| WO | 2019127138 A1 | 7/2019 | | |
| WO | 2019134643 A1 | 7/2019 | | |
| WO | WO-2020037319 A1 * | 2/2020 | ........ | H04W 52/0235 |

OTHER PUBLICATIONS

ISR received in application No. PCT/CN2021/080944 dated Jun. 8, 2021.

First Search Report of Chinses patent application No. CN202010189423.8 dated Mar. 29, 2022.

Notification to Grant Patent Right for Invention of Chinses patent application No. CN202010189423.8 dated Apr. 12, 2022.

Third Generation Partnership Project, "Technical Specification Group Radio Access Network; NR; Physical channels and modulation (Release 16)," 3GPP TS 38.211 V16.0.0 (Dec. 2019).

Third Generation Partnership Project, "Technical Specification Group Radio Access Network; NR; Multiplexing and channel coding (Release 16)," 3GPP TS 38.212 V16.0.0 (Dec. 2019).

Third Generation Partnership Project, "Technical Specification Group Radio Access Network; NR; Medium Access Control (MAC) protocol specification (Release 15)," 3GPP TS 38.321 V15.8.0 (Dec. 2019).

Third Generation Partnership Project, "Technical Specification Group Radio Access Network; NR; Physical layer procedures for data (Release 16)," 3GPP TS 38.214 V16.0.0 (Dec. 2019).

Third Generation Partnership Project, "Technical Specification Group Radio Access Network NR Radio Resource Control (RRC) protocol specification (Release 15)," 3GPP TS 38.331 V15.8.0 (Dec. 2019).

* cited by examiner

100

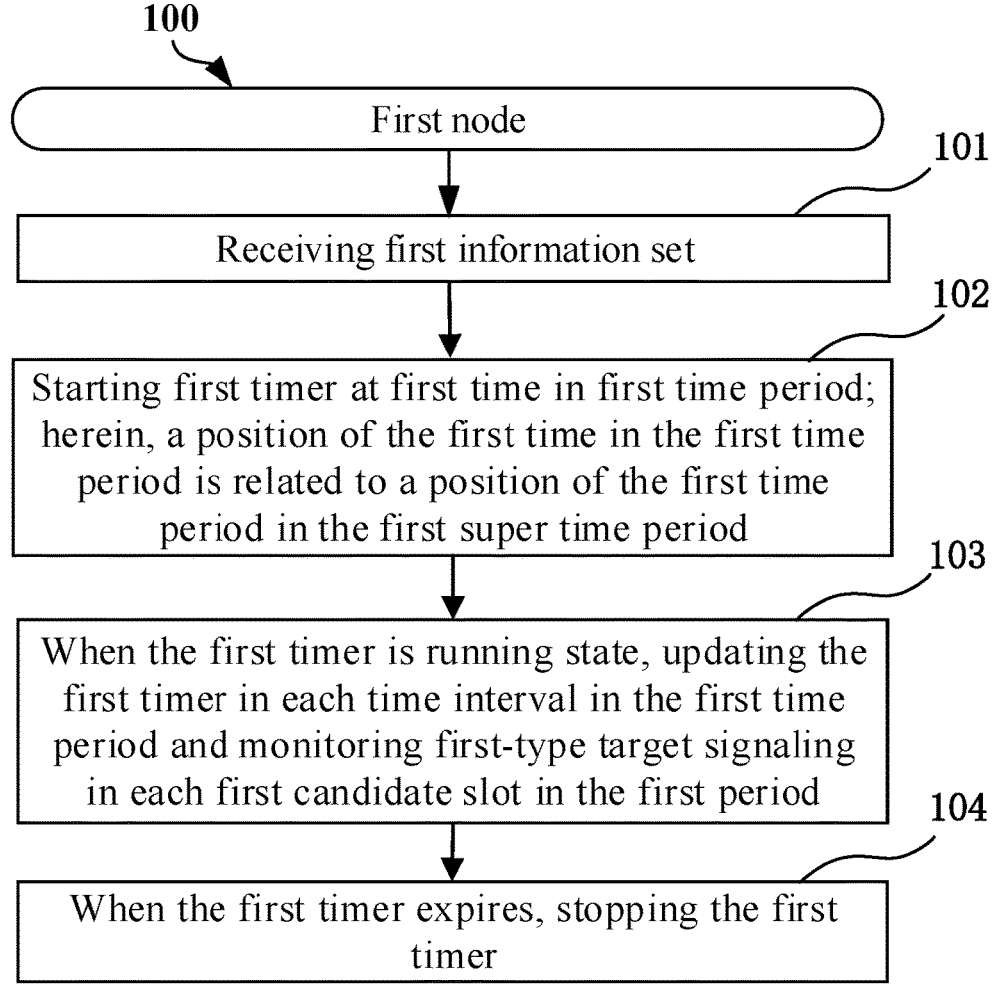

First node

101

Receiving first information set

102

Starting first timer at first time in first time period; herein, a position of the first time in the first time period is related to a position of the first time period in the first super time period

103

When the first timer is running state, updating the first timer in each time interval in the first time period and monitoring first-type target signaling in each first candidate slot in the first period

104

When the first timer expires, stopping the first timer

FIG. 1

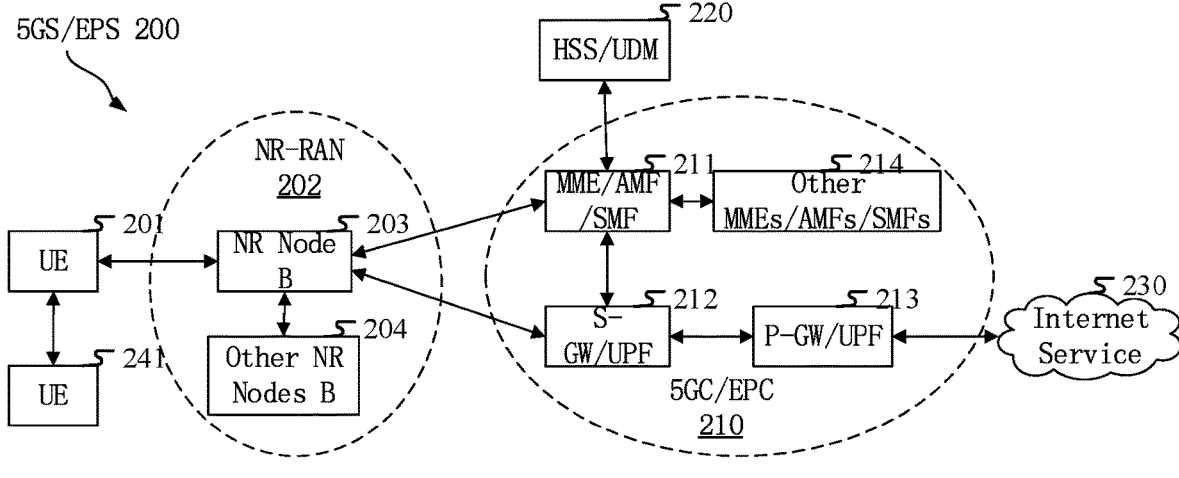

FIG. 2

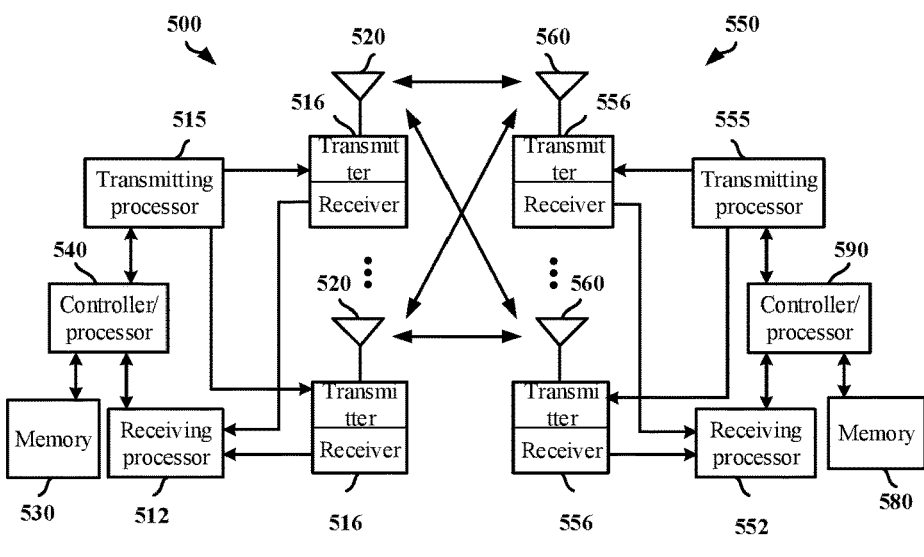

FIG. 5

| N1. Second node | U2. First node | U3. Another UE |
|---|---|---|

S11. transmitting first information set and second information set first information set and second information set →

S21. receiving first information set and second information set

S22.starting the first timer at second time in second time resource pool

S31.transmitting first-type target signaling

← – – – first-type target signaling – – – –

S23.when the first timer is in running state, updating the first timer in each first time interval in the second time resource pool and monitoring the first-type target signaling in each second candidate slot in the second time resource pool; when the first timer expires, stopping the first timer;

S24.determining position of the first time in the first time period

S25.starting first timer at first time in first time period; when the first timer is in running state, updating the first timer in each first time interval in the first time period and monitoring first-type target signaling in each first candidate slot in the first time period; when the first timer expires, stopping the first timer;

End        End        End

FIG. 6

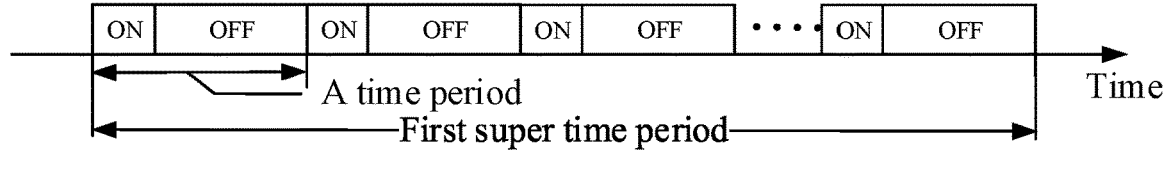
Case A
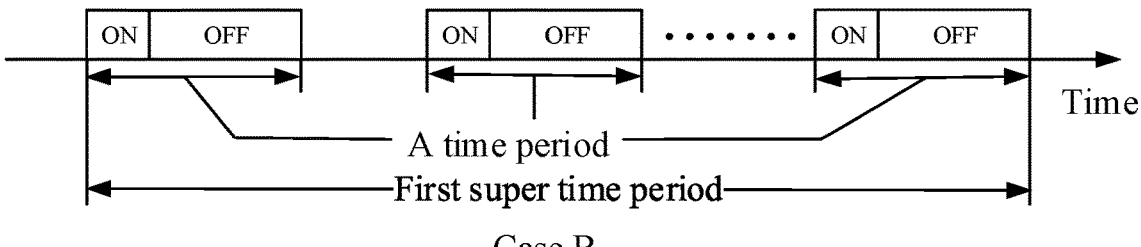
Case B
FIG. 7
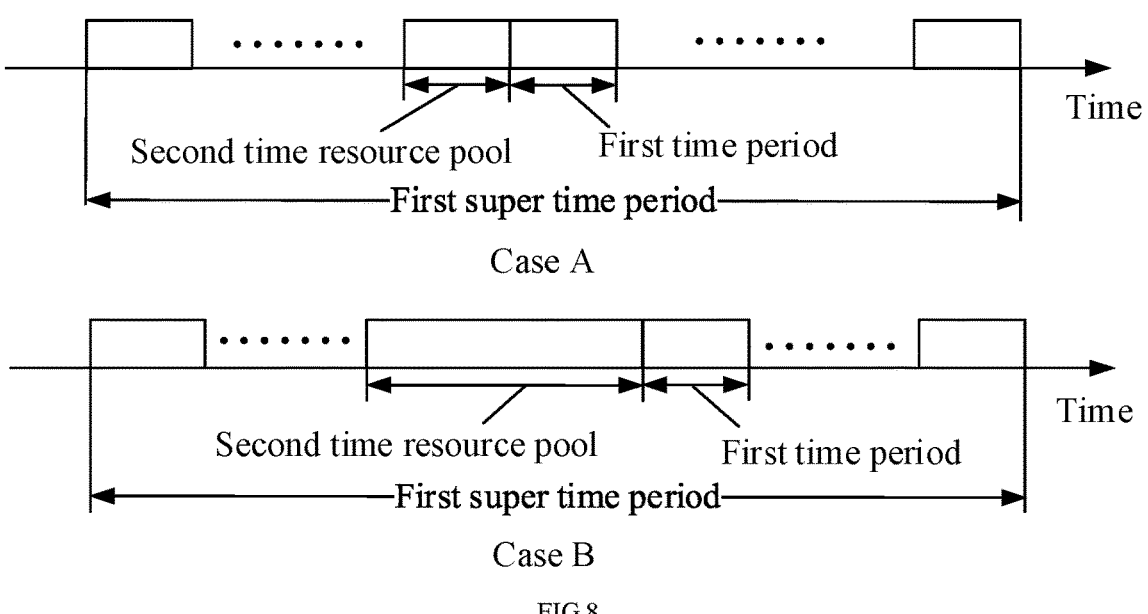
Case A
Case B
FIG.8
▨  Second time interval
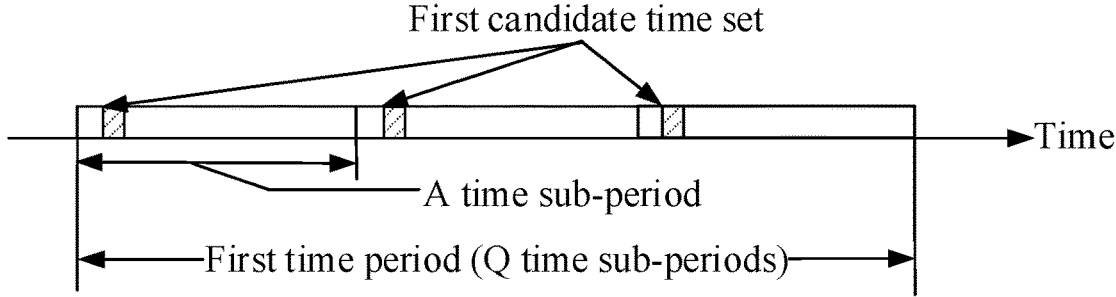
FIG. 9

⬛ Symbol reserved for DL/UL        ⬚ Symbol reserved for SL
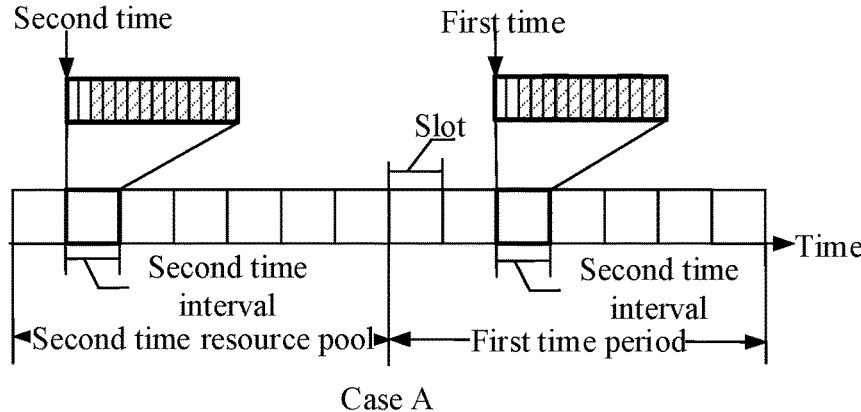
Case A
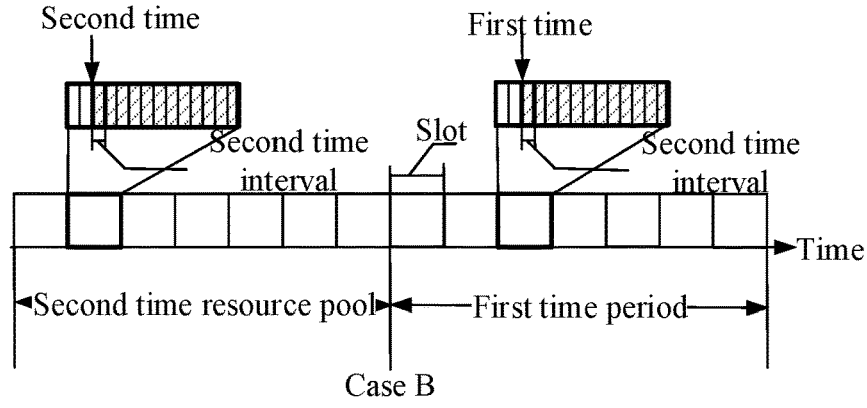
Case B
FIG. 12
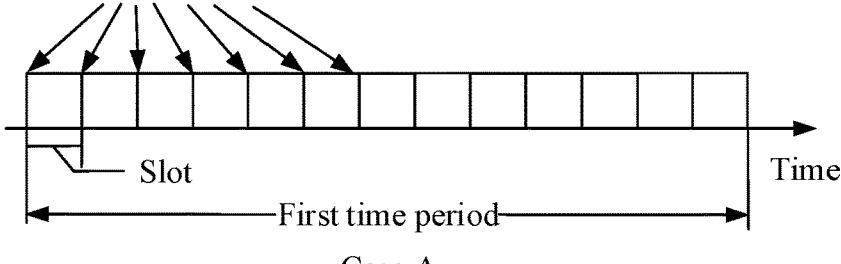
Case A
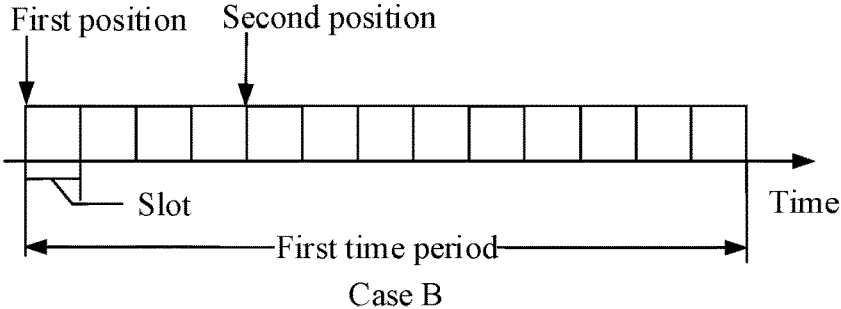
Case B
FIG. 13

METHOD AND DEVICE FOR DISCONTINUOUS WIRELESS COMMUNICATION

CROSS REFERENCE TO RELATED APPLICATIONS

This application is the continuation of the International Patent application No. PCT/CN2021/080944, filed on Mar. 16, 2021, which claims the priority benefit of Chinese Patent Application No. 202010189423.8, filed on Mar. 18, 2020, the full disclosure of which is incorporated herein by reference.

BACKGROUND

Technical Field

The present application relates to methods and devices in wireless communication systems, and in particular to a method and device supporting discontinuous transmission in sidelink wireless communications.

Related Art

Discontinuous Reception (DRX) is a method commonly used in cellular communications to reduce power consumption of communication terminals, so as to lengthen standby time. A base station manages a DRX-related timer through Downlink Control Information (DCI) or a Medium Access Control (MAC) Control Element (CE), and then, controls whether a terminal performs a radio reception in a given slot or subframe.

Application scenarios of future wireless communication systems are becoming increasingly diversified, and different application scenarios have different performance demands on systems. To meet these various performance requirements, 3rd Generation Partner Project (3GPP) Radio Access Network (RAN) #72 Plenary decided to study New Radio (NR), or what is called the Fifth Generation (5G), and later at 3GPP RAN #75 Plenary, a Work Item (WI) was approved to standardize NR. In response to rapid growth of Vehicle-to-Everything (V2X) traffics, the 3GPP also has started standard planning and research work under the framework of NR. V2X mainly provides broadcast services, and periodically transmits broadcast safety and driving related warning information to surrounding vehicles, a WI was initiated at 3GPP RAN #86 Plenary for standardization of NR V2X DRX.

SUMMARY

Inventors have found through researches that periodic broadcast services are supported in NR V2X, and a transmitting User Equipment (UE) continuously transmits a group of data packets at a fixed period. NR V2X supports a UE to work in a Radio Resource Control (RRC)-Idle or an RRC-Inactive state in out-of-coverage or in-coverage scenarios, at this time, the network cannot perform parameter configuration and control on a DRX-related-timer. If the UE uses preconfigured parameters to perform a running of a timer, a time interval when the UE performs a reception and a time interval when the transmitting UE transmits data may not be synchronized, which may lead to the UE being unable to receive data, causing driving safety problems.

To address the above problem, the present application provides a solution. It should be noted that though the present application only took NR V2X scenario for example in the statement above, it is also applicable to other scenarios confronting the same difficulty, including relay network, Device-to-Device (D2D) network, cellular networks, and scenarios supporting Half Duplex UE, where similar technical effects can be achieved. Additionally, the adoption of a unified solution for various scenarios, including but not limited to NR V2X and downlink communications, contributes to the reduction of hardcore complexity and costs. If no conflict is incurred, embodiments in the first node in the present application and the characteristics of the embodiments are also applicable to any other node, and vice versa. And the embodiments in the present application and the characteristics in the embodiments can be arbitrarily combined if there is no conflict. Particularly, for interpretations of the terminology, nouns, functions and variants (if not specified) in the present application, refer to definitions given in TS36 series, TS38 series and TS37 series of 3GPP specifications.

The present application provides a method in a first node for wireless communications, comprising:

receiving a first information set, the first information set indicating a first time length and a first expiration value; and starting a first timer at a first time in a first time period; when the first timer is running, updating the first timer in each first time interval in the first time period and monitoring a first-type target signaling in each first candidate slot in the first time period; when the first timer expires, stopping the first timer;

herein, a duration of the first time period is equal to the first time length, the first time period is a time period in a first super time period, and the first super time period comprises multiple time periods; a position of the first time in the first time period is related to a position of the first time period in the first super time period; the first expiration value is used to determine an expiration of the first timer.

In one embodiment, any two adjacent time periods in the first super time period are continuous in time domain.

In one embodiment, durations of at least two time periods in the first super time period are different.

Specifically, according to one aspect of the present application, the above method is characterized in comprising:

starting the first timer at a second time in a second time resource pool; when the first timer is running, updating the first timer in each first time interval in the second time resource pool and monitoring the first-type target signaling in each second candidate slot in the second time resource pool; when the first timer expires, stopping the first timer;

herein, the second time resource pool is within the first super time period and before the first time period, a position of the first time in the first time period is related to a result of the monitoring behavior of the first processor in the second time resource pool.

Specifically, according to one aspect of the present application, the above method is characterized in that:

the first time is any candidate time in a first candidate time set, the first candidate time set comprises Q candidate times; the first time period comprises Q time sub-periods, the Q candidate times in the first candidate time set respectively belong to the Q time sub-periods in the first time period;

herein, Q is a positive integer greater than 1.

In one embodiment, a position of the first candidate time set in the first time period is related to a position of the first time period in the first super time period.

In one embodiment, advantages of the above embodiments comprise: a position of the first time in the first time period may be determined according to a position of the first time period in the first super time period, and when the position of the first time period in the first super time period changes, the position of the first time can be changed, so as to avoid the problem that a fixed setting of the first time and a fixed setting of a duration of the first time period may not be able to receive periodic broadcast services.

Specifically, according to one aspect of the present application, the above method is characterized in comprising:

starting a first counter; when the first-type target signaling is not detected in each time period and the first counter is counting, adding 1 to a value of a first counter; when the first-type target signaling is detected in any time period, stopping the first timer; when the value of the first counter is not less than a first threshold, stopping the first counter;

herein, the second time resource pool comprises at least one time period; when the first counter is counting in a second candidate slot, the second candidate slot belongs to the second time resource pool, and the first information set indicates the first threshold.

In one embodiment, the first timer is started at least once in any time period in the first super time period, and the second time resource pool comprises a positive integer number of time period(s) in the first super time period; when the first timer is running in each of the positive integer time period(s), the first-type target signaling is detected for a first time in a latest time period in the second time resource pool.

In one embodiment, advantages of the above embodiments comprise: when the first-type target signaling is not detected in each second candidate slot in the second time resource pool determined by the first threshold, it is judged that a setting of the second start time may not be able to receive periodic broadcast services, and at least one of the first start time or the first time period is adjusted in time, so as to receive the periodic broadcast services.

In one embodiment, advantages of the above embodiments comprise: when the first-type target signaling is detected in the second candidate slot in the second time resource pool, it is determined that a setting of the second start time can receive periodic broadcast services, and the first start time and the first time period can be determined by using historical information, so as to receive periodic broadcast services.

Specifically, according to one aspect of the present application, the above method is characterized in comprising:

receiving a second information set, the second information set indicating a first time resource pool;

herein, each first candidate slot belongs to the first time resource pool.

The present application provides a method in a second node for wireless communications, comprising:

transmitting a first information set, the first information set indicating a first time length and a first expiration value; and a first timer being started at a first time in a first time period; when the first timer is running, the first timer being updated in each first time interval in the first time period and a first-type target signaling being monitored in each first candidate slot in the first time period; when the first timer expires, the first timer being stopped;

herein, a duration of the first time period is equal to the first time length, the first time period is a time period in a first super time period, and the first super time period comprises multiple time periods; a position of the first time in the first time period is related to a position of the first time period in the first super time period; the first expiration value is used to determine an expiration of the first timer.

Specifically, according to one aspect of the present application, the above method is characterized in that:

the first timer is started at a second time in a second time resource pool; when the first timer is running, the first timer is updated in each first time interval in the second time resource pool and the first-type target signaling is monitored in each second candidate slot in the second time resource pool; when the first timer expires, the first timer is stopped;

herein, the second time resource pool is within the first super time period and before the first time period, a position of the first time in the first time period is related to a result of the monitoring behavior of the first processor in the second time resource pool.

Specifically, according to one aspect of the present application, the above method is characterized in that:

the first time is any candidate time in a first candidate time set, the first candidate time set comprises Q candidate times; the first time period comprises Q time sub-periods, the Q candidate times in the first candidate time set respectively belong to the Q time sub-periods in the first time period;

herein, Q is a positive integer greater than 1.

Specifically, according to one aspect of the present application, the above method is characterized in that:

a first counter is started; when the first-type target signaling is not detected in each time period and the first counter is counting, a value of the first counter is added by 1; when the first-type target signaling is detected in any time period, the first timer is stopped; when a value of the first counter is not less than a first threshold, the first counter is stopped;

herein, the second time resource pool comprises at least one time period; when the first counter is counting in a second candidate slot, the second candidate slot belongs to the second time resource pool, and the first information set indicates the first threshold.

Specifically, according to one aspect of the present application, the above method is characterized in comprising:

transmitting a second information set, the second information set indicating a first time resource pool;

herein, each first candidate slot belongs to the first time resource pool.

The present application provides a first node for wireless communications, comprising:

a first receiver, receiving a first information set, the first information set indicating a first time length and a first expiration value;

a first processor, starting a first timer at a first time in a first time period; when the first timer is running, updating the first timer in each first time interval in the first time period and monitoring a first-type target signaling in each first candidate slot in the first time period; when the first timer expires, stopping the first timer;

herein, a duration of the first time period is equal to the first time length, the first time period is a time period in a first super time period, and the first super time period comprises multiple time periods; a position of the first time in the first time period is related to a position of the first time period in the first super time period; the first expiration value is used to determine an expiration of the first timer.

The present application provides a second node for wireless communications, comprising:

a first transmitter, transmitting a first information set, the first information set indicating a first time length and a first expiration value; and a first timer being started at a first time in a first time period; when the first timer is running, the first timer being updated in each first time interval in the first time period and a first-type target signaling being monitored in each first candidate slot in the first time period; when the first timer expires, the first timer being stopped;

herein, a duration of the first time period is equal to the first time length, the first time period is a time period in a first super time period, and the first super time period comprises multiple time periods; a position of the first time in the first time period is related to a position of the first time period in the first super time period; the first expiration value is used to determine an expiration of the first timer.

In one embodiment, the method in the present disclosure is advantageous in the following aspects:

by adopting the method in the present application, the UE updates one of a start time of a discontinuous reception time window or a duration of a time period at intervals, which can avoid the problem of continuous packet missing and the receiving UE cannot receive data incurred by a time interval when the UE performs a reception and a time interval when the UE transmits data are not synchronized.

the method of the present application can meet the power saving demand without affecting the UE to receive the periodic broadcast services, thus improving the transmission reliability.

BRIEF DESCRIPTION OF THE DRAWINGS

Other features, objects and advantages of the present application will become more apparent from the detailed description of non-restrictive embodiments taken in conjunction with the following drawings:

FIG. 1 illustrates a flowchart of a first information set, a first timer and a first processor according to one embodiment of the present application;

FIG. 2 illustrates a schematic diagram of a network architecture according to one embodiment of the present application;

FIG. 5 illustrates a schematic diagram of a first node and another UE according to one embodiment of the present application;

FIG. 6 illustrates a flowchart of a radio signal transmission according to one embodiment of the present application;

FIG. 7 illustrates a schematic diagram of a first super time period and a time period according to one embodiment of the present application;

FIG. 8 illustrates a schematic diagram of a second time resource pool, a first time period and a first super time period according to one embodiment of the present application;

FIG. 9 illustrates a schematic diagram of a first candidate time set, a first time period, a second time interval and a time sub-period according to one embodiment of the present application;

FIG. 12 illustrates a schematic diagram of a first time and a second time interval according to one embodiment of the present application;

FIG. 13 illustrates a schematic diagram of K possible positions of a first time and a first time period according to one embodiment of the present application;

DESCRIPTION OF THE EMBODIMENTS

Figure 3:
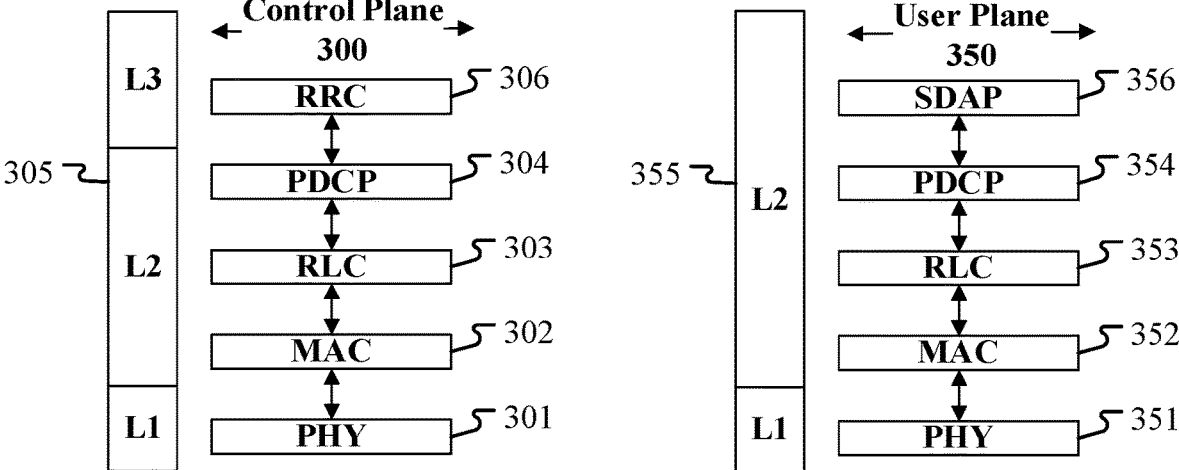
FIG. 3 illustrates a schematic diagram of a radio protocol architecture of a user plane and a control plane according to one embodiment of the present application.

The technical scheme of the present application is described below in further details in conjunction with the drawings. It should be noted that the embodiments of the present application and the characteristics of the embodiments may be arbitrarily combined if no conflict is caused.

Embodiment 1

Embodiment 1 illustrates a flowchart of a first information set, a first timer and a first processor according to one embodiment of the present application, as shown in FIG. 1. In FIG. 1, each box represents a step. Particularly, the sequential order of steps in these boxes does not necessarily mean that the steps are chronologically arranged.

In embodiment 1, a first node 100 in the present application receives a first information set in step 101, and the first information set indicates a first time length and a first expiration value; starts a first timer at a first time in a first time period in step 102; herein, a position of the first time in the first time period is related to a position of the first time period in the first super time period; when the first timer is running in step 103, updates the first timer in each first time interval in the first time period and monitors a first-type target signaling in each first candidate slot in the first time period; in step 104, when the first timer expires, stops the first timer.

In one embodiment, the first information set comprises multiple pieces of first information.

In one embodiment, the first information is transmitted by the second node in the present application to the first node.

In one embodiment, the first information is transmitted internally within the first node in the present application.

In one embodiment, the first information is higher-layer information.

In one embodiment, the first information is conveyed from a higher layer of the first node in the present application to a Media Access Control (MAC) layer of the first node in the present application.

In one embodiment, the first information is configured.

In one embodiment, the first information is pre-configured.

In one embodiment, the first information is a downlink signaling.

In one embodiment, the first information is a downlink RRC layer signaling.

In one embodiment, the first information comprises all or partial IEs in an RRC signaling.

In one embodiment, the first information comprises all or partial fields in an RRC signaling.

In one embodiment, the first information comprises all or partial IEs in a piece of System Information Block (SIB) information.

In one embodiment, the first information comprises all or partial fields in an IE in a piece of SIB information.

In one embodiment, the first information is Cell-Specific.

In one embodiment, the first information is a piece of zone-specific information, and the zone is determined by position information of a UE.

In one embodiment, the first information is UE group-specific information.

In one embodiment, the first information is UE-specific information.

In one embodiment, the first information is transmitted through a Downlink Shared Channel (DL-SCH).

In one embodiment, the first information is transmitted through a Physical Downlink Shared Channel (PDSCH).

In one embodiment, the first information is broadcast.

In one embodiment, the first information is unicast.

In one embodiment, the first information is groupcast.

In one embodiment, a first candidate slot comprises 14 multicarrier symbols.

In one embodiment, a first candidate slot comprises 12 multicarrier symbols.

In one embodiment, a first candidate slot comprises a search space of an SCI.

In one embodiment, the multicarrier symbol is an Orthogonal Frequency Division Multiplexing (OFDM) symbol.

In one embodiment, the multicarrier symbol is a Single-Carrier Frequency-Division Multiple Access (SC-FDMA) symbol.

In one embodiment, the multicarrier symbol is a Filter Bank Multicarrier (FBMC) symbol.

In one embodiment, the first time period comprises more than one subframe.

In one embodiment, the first time period comprises more than one sidelink subframe.

In one embodiment, the first time period comprises more than one slot.

In one embodiment, the first time period comprises more than one sidelink slot.

In one embodiment, the first time period comprises more than one slot, and at least one of the more than one slot is a sidelink slot.

In one embodiment, in each first candidate slot in the first time period, the first node is in a continuous receiving state.

In one embodiment, in each first candidate slot in the first time period, the first node monitors the first-type target signaling in the present application on sidelink.

In one embodiment, the first-type target signaling is a physical-layer signaling.

In one embodiment, the first-type target signaling comprises physical-layer control information.

In one embodiment, the first-type target signaling comprises Sidelink Control Information (SCI).

In one embodiment, when SCI comprises 2-stage SCI, the first-type target signaling comprises 2nd stage SCI.

In one embodiment, the first-type target signaling is transmitted through a PSCCH.

In one embodiment, the first-type target signaling is transmitted through a PSSCH.

In one subembodiment of the above embodiment, the first-type target signaling occupies partial resources of a PSSCH channel for a transmission.

In one embodiment, the first-type target signaling is transmitted via an air interface.

In one embodiment, the first-type target signaling is transmitted via a radio interface.

In one embodiment, the first-type target signaling is transmitted via a PC5 interface.

In one embodiment, the first-type target signaling is transmitted via a Uu interface.

In one embodiment, the first-type target signaling is transmitted through an SL.

In one embodiment, the first-type target signaling is UE-specific.

In one embodiment, the first-type target signaling is UE group-specific.

In one embodiment, the first-type target signaling is service-specific.

In one embodiment, the first-type target signaling is groupcast.

In one embodiment, the first-type target signaling is broadcast.

In one embodiment, the first-type target signaling occupies time-domain resources in the first candidate slot.

In one embodiment, the first-type target signaling is monitored in each first candidate slot performing a radio reception in the first time period.

In one embodiment, the first-type target signaling is monitored in each first candidate slot performing a sidelink radio reception in the first time period.

In one embodiment, the phrase of a first-type target signaling being monitored in each first candidate slot in the first time period comprises: executing an energy detection for the first-type target signaling in each first candidate slot in the first time period.

In one embodiment, the phrase of a first-type target signaling being monitored in each first candidate slot in the first time period comprises: executing a CRC check for the first-type target signaling in each first candidate slot in the first time period.

In one embodiment, the phrase of a first-type target signaling being monitored in each first candidate slot in the first time period comprises: executing a blind decoding for the first-type target signaling in each first candidate slot in the first time period.

In one embodiment, the phrase of a first-type target signaling being monitored in each first candidate slot in the first time period comprises: respectively executing blind decoding on each RE set in multiple RE sets in each first candidate slot in the first time period.

In one embodiment, the phrase of a first-type target signaling being monitored in each first candidate slot in the first time period comprises: executing a blind decoding for the first-type target signaling in each first candidate slot in the first time period, and executing an energy detection on a reference signal of a target radio signal and executing decoding on the target radio signal; the first-type target signaling is used to indicate time-frequency resources occupied by the target radio signal and a Modulation and Coding Scheme (MCS) adopted by the target radio signal.

In one embodiment, the phrase of a first-type target signaling being monitored in each first candidate slot in the first time period comprises: executing blind decoding on a PSCCH according to a $1^{st}$ stage SCI format, executing an energy detection on a reference signal of a PSSCH and executing a decoding on the PSSCH in each first candidate slot in the first time period; the $1^{st}$ stage SCI is used to indicate time-frequency resources occupied by the PSSCH and time-frequency resources occupied by the $2^{nd}$ stage SCI, the PSSCH comprises a $2^{nd}$ stage SCI, and the $2^{nd}$ stage SCI indicates an MCS of the PSSCH.

In one embodiment, a position of the first time in the first time period is one of K positions, and the first super time period comprises K time periods; the first time period is one of the K time periods, an index of the first time period in the K time periods is the same as an index of the first time in the K positions, K being a positive integer greater than 1, and the K indexes are 0, 1, 2, . . . , K−1.

In one embodiment, a position of the first time in the first time period is one of two positions, and the first super time period comprises K time periods; the first time period is one of the K time periods; when an index of the first time period in the K time periods is an odd number, the first time is one of the two positions; when an index of the first time period in the K time periods is an even number, the first time is the other one of the two positions; the K is a positive integer greater than 2, and the K indexes are 0, 1, 2, . . . , K−1.

In one embodiment, a position of the first time in the first time period is one of K positions, and the first super time period comprises L time periods; the first time period is one of the L time periods; a remainder of an index of the first time period in the L time periods divided by K is the same as an index of the first time period in the K positions, where K is a positive integer greater than 1, L is a positive integer greater than 1, the K indexes are 0, 1, 2, . . . , K−1, and the L indexes are 0, 1, 2, . . . , L−1.

Embodiment 2

Embodiment 2 illustrates a schematic diagram of a network architecture according to the present application, as shown in FIG. 2. FIG. 2 is a diagram illustrating a network architecture 200 of 5G NR, Long-Term Evolution (LTE), and Long-Term Evolution Advanced (LTE-A) systems. The NR 5G or LTE network architecture 200 may be called an Evolved Packet System (EPS) 200 The 5GS/EPS 200 may comprise one or more UEs 201, an NG-RAN 202, a 5G Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will readily understand that various concepts presented throughout the present application can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmit-Receive Point (TRP) or some other applicable terms. In NTN network, the gNB 203 may be a satellite, an aircraft or a territorial base station relayed through a satellite. The gNB 203 provides an access point of the 5GC/EPC 210 for the UE 201. Examples of the UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, game consoles, unmanned aerial vehicles (UAV), aircrafts, narrow-band physical network devices, machine-type communication devices, land vehicles, automobiles, vehicle equipment, On-board communication unit, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMEs/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first node in the present application.

In one embodiment, the UE 201 supports SL communications.

In one embodiment, the UE 201 supports a PC5 interface.

In one embodiment, the UE 201 supports Internet of Vehicles.

In one embodiment, the UE 201 supports V2X services.

In one embodiment, the UE 201 corresponds to the second node in the present application.

In one embodiment, the gNB 203 corresponds to the second node in the present application.

In one embodiment, the gNB 203 supports Internet of Vehicles.

In one embodiment, the gNB 203 supports V2X services.

In one embodiment, the gNB 203 is a Marco Cell base station.

In one embodiment, the gNB 203 is a Micro Cell base station.

In one embodiment, the gNB 203 is a Pico Cell base station.

In one embodiment, the gNB 203 is a Femtocell.

In one embodiment, the gNB 203 is a base station that supports large delay differences.

In one embodiment, the gNB 203 is a flight platform.

In one embodiment, the gNB 203 is satellite equipment.

In one embodiment, a radio link between the UE 201 to the gNB 203 is an uplink.

In one embodiment, a radio link between gNB 203 to the UE 201 is a downlink.

In one embodiment, a radio link between the UE 201 and the UE 241 corresponds to a sidelink in the present application.

Embodiment 3

Embodiment 3 illustrates a schematic diagram of an example of a radio protocol architecture of a user plane and a control plane according to one embodiment of the present application, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first node (UE or RSU in V2X, vehicle equipment or On-Board Communication Unit) and a second node (gNB, UE or RSU in V2X, vehicle equipment or On-Board Communication Unit), or between two UEs is represented by three layers, which are respectively layer 1, layer 2 and layer 3. The layer 1 (L1) is the lowest layer and performs signal processing functions of various PHY layers. The L1 is called PHY 301 in the present application. The layer 2 (L2) 305 is above the PHY 301, and is in charge of the link between the first node and the second node, and between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All the three sublayers terminate at the second nodes. The PDCP sublayer 304 provides data encryption and integrity protection and provides support for handover of a first node between second nodes. The RLC sublayer 303 provides segmentation and reassembling of a packet, retransmission of a lost data packet through ARQ, as well as repeat data packet detection and protocol error detection. The MAC sublayer 302 provides mapping between a logic channel and a transport channel and multiplexing of the logical channel. The MAC sublayer 302 is also responsible for allocating between first nodes various radio resources (i.e., resource block) in a cell. The MAC sublayer 302 is also responsible for Hybrid Automatic Repeat Request (HARQ) operation. The RRC sublayer 306 in layer 3 in the control plane 300 is responsible for acquiring radio resources (i.e., radio bearer) and configuring the lower layer using an RRC signaling between the second node and the first node. The radio protocol architecture in the user plane 350 comprises the L1 layer and the L2 layer. In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first node may comprise several higher layers above the L2 305, such as a network layer (i.e., IP layer) terminated at a P-GW of the network side and an application layer terminated at the other side of the connection (i.e., a peer UE, a server, etc.).

In one embodiment, the radio protocol architecture in FIG. 3 is applicable to the first node in the present application.

In one embodiment, the radio protocol architecture in FIG. 3 is applicable to the second node in the present application.

In one embodiment, the first information set in the present application is generated by the RRC 306.

In one embodiment, the first information set in the present application is generated by the MAC 302 or the MAC 352.

In one embodiment, the first information set in the present application is generated by the PHY 301 or the PHY 351.

In one embodiment, the second information set in the present application is generated by the RRC 306.

In one embodiment, the second information set in the present application is generated by the MAC 302 or the MAC 352.

In one embodiment, the second information set in the present application is generated by the PHY 301 or the PHY 351.

In one embodiment, the first-type target signaling in the present application is generated by the PHY 301 or the PHY 351.

In one embodiment, the L2 layer 305 or 355 belongs to a higher layer.

In one embodiment, the L3 layer RRC sublayer 306 belongs to a higher layer.

In one embodiment, the radio protocol architecture in FIG. 3 is applicable to the first node in the present application.

In one embodiment, the radio protocol architecture in FIG. 3 is applicable to the second node in the present application.

Embodiment 4

Figure 4:
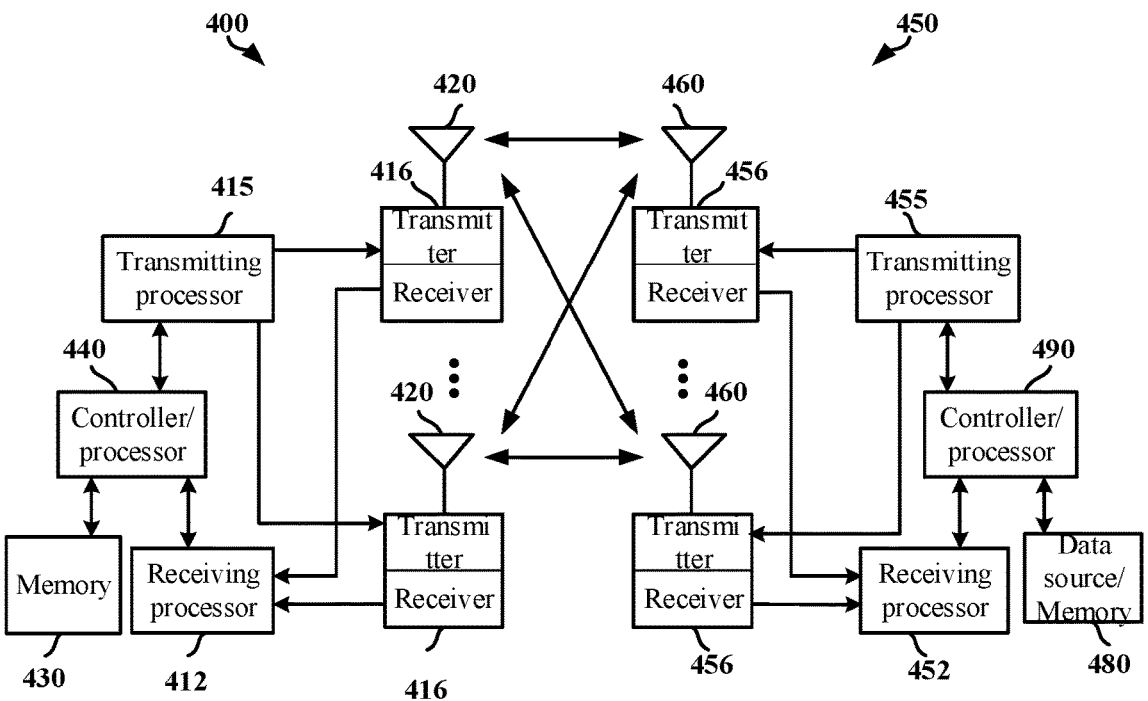
FIG. 4 illustrates a schematic diagram of a first node and a second node according to one embodiment of the present application.

Embodiment 4 illustrates a schematic diagram of a first node and a second node according to the present application, as shown in FIG. 4.

The first node (450) may comprise a controller/processor 490, a receiving processor 452, a transmitting processor 455, a transmitter/receiver 456 and a data source/memory 480, wherein the transmitter/receiver 456 comprises an antenna 460.

The second node (400) may comprise a controller/processor 440, a receiving processor 412, a transmitting processor 415, a transmitter/receiver 416, and a memory 430, wherein the transmitter/receiver 416 comprises an antenna 420.

In a transmission from the second node 400 to the first node 450, at the second node 400, a higher layer packet is provided to the controller/processor 440. The controller/processor 440 implements the functionality of the L2 layer and the higher layer. In a transmission from the second node 400 to the first node 450, the controller/processor 440 provides header compression, encryption, packet segmentation and reordering, and multiplexing between a logical channel and a transport channel, and radio resource allocation of the first node 450 based on various priorities. The controller/processor 440 is also in charge of HARQ operation, retransmission of a lost packet, and a signaling to the first node 450. The transmitter processor 415 implements various signal processing functions of the L1 layer (that is, PHY), including coding, interleaving, scrambling, modulation, power control/allocation, precoding and generation of physical layer control signaling. Modulated signals are divided into parallel streams and each stream is mapped onto corresponding multicarrier subcarriers and/or multicarrier symbols, which are then mapped from the transmitting processor 415 to the antenna 420 via the transmitter 416 to be transmitted in the form of RF signals.

In the transmission from the second node 400 to the first node 450, at the first node 450, each receiver 456 receives an RF signal via a corresponding antenna 460, each receiver 456 recovers baseband information modulated to the RF carrier and provides the baseband information to the receiving processor 452. The receiving processor 452 provides various signal receiving functions for the L1 layer. The signal receiving processing functions include reception of physical layer signals, demodulation of multicarrier symbols in multicarrier symbol streams based on each modulation scheme (e.g., BPSK, QPSK), and then descrambling, decoding and de-interleaving of the demodulated symbols so as to recover data or control signals transmitted by the second node 410 on a physical channel, and the data or control signals are later provided to the controller/processor 490. The controller/processor 490 implements the functionality of the L2 layer and the higher layer. The controller/processor can be connected to a memory 480 that stores program code and data. The data source/memory 480 may be called a computer readable medium.

In a transmission from the first node 450 to the second node 400, at the first node 450, the data source/memory 480 provides higher-layer data to the controller/processor 490. The data source/memory 480 represents all protocol layers of the L2 layer and above the L2 layer. The controller/ processor 490 performs the L2 layer protocol for the user plane and the control plane by providing header compression, encryption, packet segmentation and reordering, as well as multiplexing between a logic channel and a transport channel through radio resources allocation based on the second node 410. The controller/processor 490 is also in charge of HARQ operation, a retransmission of a lost packet and a signaling to the second node 410. The transmitting processor 455 performs various signal processing functions on the layer L1 (i.e., the physical layer). The signal transmitting processing function comprises performing coding and interleaving so as to ensure a Forward Error Correction (FEC) at the UE 450 side and performing modulation to baseband signals according to each modulation scheme (i.e., BPSK, QPSK, M-PSK, and M-QAM, etc.). Modulated signals are divided into parallel streams and each stream is mapped onto corresponding multicarrier subcarriers and/or multicarrier symbols, which are then mapped from the transmitting processor 415 to the antenna 420 via the transmitter 416 to be transmitted in the form of RF signals.

In the transmission from the first node 450 to the second node 400, at the second node 400, the receiver 416 receives an RF signal via its corresponding antenna 420, and each receiver 416 recovers baseband information modulated to an RF carrier, and supplies the baseband information to the receiving processor 412. The receiving processor 412 performs various signal receiving processing functions of the L1 layer. The signal receiving processing functions include acquisition of multicarrier symbol streams, demodulation of multicarrier symbols in multicarrier symbol streams based on each modulation scheme (e.g., BPSK, QPSK), and then decoding and de-interleaving of the demodulated symbols so as to recover data or control signals transmitted by the first node 450 on a physical channel. The data and the control signal are then provided to the controller/processor 440. The controller/processor 440 implements the functionality of the L2 layer. The controller/processor 440 can be connected to a memory 430 that stores program code and data. The memory 430 may be called a computer readable medium.

In one embodiment, the first node 450 comprises at least one processor and at least one memory. The at least one memory comprises computer program codes; the at least one memory and the computer program codes are configured to be used in collaboration with the at least one processor. The first node 450 at least: receives a first information set, the first information set indicates a first time length and a first expiration value; starts a first timer at a first time in a first time period; when the first timer is running, updates the first timer in each first time interval in the first time period and monitors a first-type target signaling in each first candidate slot in the first time period; when the first timer expires, stops the first timer; herein, the first time period is a time period in a first super time period, and the first super time period comprises multiple time periods; a position of the first time in the first time period is related to a position of the first time period in the first super time period; the first expiration value is used to determine an expiration of the first timer.

In one embodiment, the first node 450 comprises a memory that stores a computer readable instruction program. The computer readable instruction program generates an action when executed by at least one processor. The action includes: receiving a first information set, the first information set indicating a first time length and a first expiration value; starting a first timer at a first time in a first time period; when the first timer is running, updating the first timer in each first time interval in the first time period and monitoring a first-type target signaling in each first candidate slot in the first time period; when the first timer expires, stopping the first timer; herein, the first time period is a time period in a first super time period, and the first super time period comprises multiple time periods; a position of the first time in the first time period is related to a position of the first time period in the first super time period; the first expiration value is used to determine an expiration of the first timer.

In one embodiment, the second node 400 comprises at least one processor and at least one memory. The at least one memory comprises computer program codes; the at least one memory and the computer program codes are configured to be used in collaboration with the at least one processor. The second node 400 at least: transmits a first information set, the first information set indicates a first time length and a first expiration value; a first timer is started at a first time in a first time period; when the first timer is running, the first timer is updated in each first time interval in the first time period and a first-type target signaling is monitored in each first candidate slot in the first time period; when the first timer expires, the first timer is stopped; herein, the first time period is a time period in a first super time period, and the first super time period comprises multiple time periods; a position of the first time in the first time period is related to a position of the first time period in the first super time period; the first expiration value is used to determine an expiration of the first timer.

In one embodiment, the second node 400 comprises a memory that stores a computer readable instruction program. The computer readable instruction program generates an action when executed by at least one processor. The action includes: transmitting a first information set, the first information set indicating a first time length and a first expiration value; a first timer being started at a first time in a first time period; when the first timer is running, the first timer being updated in each first time interval in the first time period and a first-type target signaling being monitored in each first candidate slot in the first time period; when the first timer expires, the first timer being stopped; herein, the first time period is a time period in a first super time period, and the first super time period comprises multiple time periods; a position of the first time in the first time period is related to a position of the first time period in the first super time period; the first expiration value is used to determine an expiration of the first timer.

In one embodiment, the first node 450 is a UE.

In one embodiment, the first node 450 is a UE supporting V2X.

In one embodiment, the first node 450 is a UE supporting D2D.

In one embodiment, the first node 450 is vehicle-mounted equipment.

In one embodiment, the first node 450 is an RSU.

In one embodiment, the second node 400 is a base station supporting V2X.

In one embodiment, the second node 400 is a UE.

In one embodiment, the second node 400 is a UE supporting V2X.

In one embodiment, the first node 400 is a UE supporting D2D.

In one embodiment, the second node 400 is vehicle-mounted equipment.

In one embodiment, the second node 400 is an RSU.

In one embodiment, the receiver 456 (comprising the antenna 460), the receiving processor 452 and the controller/processor 490 are used to receive the first information set in the present application, a second information set and a first-type target signaling.

In one embodiment, the transmitter 416 (including the antenna 420), the transmitting processor 415 and the controller/processor 440 are used to transmit the first information set in the present application and a second information set.

Embodiment 5

Embodiment 5 illustrates a schematic diagram of a first node and another UE according to the present application, as shown in FIG. 5.

The first node (550) comprises a controller/processor 590, a memory 580, a receiving processor 552, a transmitter/receiver 556 and a transmitting processor 555, wherein the transmitter/receiver 556 comprises an antenna 560.

Composition in the another UE 500 is the same as that in the first node 550.

In a transmission from the another UE 500 to the first node 550, a higher layer packet is provided to the controller/processor 590, and the controller/processor 590 implements the functionality of the L2 layer. In the transmission from the another UE 500 to the first node 550, the controller/processor 590 provides header compression, encryption, packet segmentation and reordering, and multiplexing between a logical channel and a transport channel. The controller/processor 590 is also in charge of HARQ operation (if supported), a retransmission and a signaling to the UE 500. The transmitting processor 555 implements various signal processing functions of the L1 layer (that is, PHY), including coding, interleaving, scrambling, modulation, power control/allocation, precoding and generation of physical layer control signaling. Modulated symbols are divided into parallel streams and each stream is mapped onto corresponding multicarrier subcarriers and/or multicarrier symbols, which are then mapped from the transmitting processor 555 to the antenna 560 via the transmitter 556 to be transmitted in the form of RF signals. At the receiving side of the first node, each receiver 516 receives an RF signal via a corresponding antenna 520, each receiver 516 recovers baseband information modulated to the RF carrier and provides the baseband information to the receiving processor 512. The receiving processor 512 provides various signal receiving functions for the L1 layer. The signal receiving processing functions include reception of a physical layer signal, demodulation of multicarrier symbols in multicarrier symbol streams based on each modulation scheme (e.g., BPSK, QPSK), and then descrambling, decoding and de-interleaving of the demodulated symbols so as to recover data or control signals transmitted by the first communication node 550 on a physical channel, and the data or control signals are later provided to the controller/processor 540. The controller/processor 540 implements processing of the L2 layer and interprets higher layer information. The controller/processor can be connected to a memory 530 that stores program code and data. The memory 530 may be called a computer readable medium.

In one embodiment, the transmitter 516 (including the antenna 520), the transmitting processor 515 and the controller/processor 540 are used to transmit the first-type target signaling in the present application.

In one embodiment, the receiver 556 (including the antenna 560), the receiving processor 552 and the controller/processor 590 are used to receive the first-type target signaling in the present application.

Embodiment 6

Embodiment 6 illustrates a flowchart of radio signal transmission according to one embodiment of the present application, as shown in FIG. 6. In FIG. 6, a second node N1 and a first node U2 are in communications via downlink. It is particularly underlined that the order illustrated in the embodiment does not put constraints over sequences of signal transmissions and implementations. In FIG. 6, steps in box FO are optional.

The second node N1 transmits a first information set and a second information set in step S11.

The first node U2 receives a first information set and a second information set in step S21, and starts the first timer at a second time in a second time resource pool in step S22; when the first timer is running in step S23, updates the first timer in each first time interval in the second time resource pool and monitors the first-type target signaling in each second candidate slot in the second time resource pool; determines a position of the first time in the first time period in step S24; starts a first timer at a first time in a first time period in step S25; when the first timer is running, updates the first timer in each first time interval in the first time period and monitors a first-type target signaling in each first candidate slot in the first time period; when the first timer expires, stops the first timer.

Another UE U3 transmits a first-type target signaling in step S31.

In embodiment 6, a first information set is received, the first information set indicates a first time length and a first expiration value; a first timer is started at a first time in a first time period; when the first timer is running, the first timer is updated in each first time interval in the first time period and a first-type target signaling is monitored in each first candidate slot in the first time period; when the first timer expires, the first timer is stopped; herein, a duration of the first time period is equal to the first time length, the first time period is a time period in a first super time period, and the first super time period comprises multiple time periods; a position of the first time in the first time period is related to a position of the first time period in the first super time period; the first expiration is used to determine an expiration of the first timer; the first timer is started at a second time in a second time resource pool; when the first timer is running, updating the first timer in each first time interval in the second time resource pool and monitoring the first-type target signaling in each second candidate slot in the second time resource pool; when the first timer expires, the first timer is started; herein, the second time resource pool is within the first super time period and before the first time period, a position of the first time in the first time period is related to a result of the monitoring behavior of the first processor in the second time resource pool; the first time is any candidate time in a first candidate time set, the first candidate time set comprises Q candidate times; the first time period comprises Q time sub-periods, the Q candidate times in the first candidate time set respectively belong to the Q time sub-periods in the first time period; herein, Q is a positive integer greater than 1; a first counter is started; when the first-type target signaling is not detected in each time period and the first counter is counting, 1 is added to a value of a first counter; the first-type target signaling is detected in any time period, the first timer is stopped; when a value of the first counter is not less than a first threshold, the first counter is stopped; herein, the second time resource pool comprises at least one time period; when the first counter is counting in a second candidate slot, the second candidate slot belongs to the second time resource pool, and the first information set indicates a first threshold; a second information set is received, the second information set indicates a first time resource pool; herein, each first candidate slot belongs to the first time resource pool.

In one embodiment, the first node U2 is a UE.

In one embodiment, the first node U2 receives the first information set transmitted by the second node N1, and the first information set indicates a first time length, a first expiration value and a first threshold.

In one embodiment, the first node U2 receives the second information set transmitted by the second node N1, and the second information set indicates the first time resource pool.

In one embodiment, the second information set comprises multiple pieces of second information.

In one embodiment, the second information is transmitted internally within the first node.

In one embodiment, the second information is higher-layer information.

In one embodiment, the second information is conveyed from a higher layer of the first node in the present disclosure to a Media Access Control (MAC) layer of the first node.

In one embodiment, the second information is configured.

In one embodiment, the second information is pre-configured.

In one embodiment, the second information is a downlink signaling.

In one embodiment, the second information is a downlink RRC layer signaling.

In one embodiment, the second information comprises all or partial IEs in an RRC signaling.

In one embodiment, the second information comprises all or partial fields in an RRC signaling.

In one embodiment, the second information comprises all or partial IEs in a piece of System Information Block information.

In one embodiment, the second information comprises all or partial fields in an IE in a piece of SIB information.

In one embodiment, the second information is Cell-Specific.

In one embodiment, the second information is a piece of zone-specific information, and the zone is determined by position information of a UE.

In one embodiment, the second information is UE group-specific information.

In one embodiment, the second information is UE-specific information.

In one embodiment, the second information is transmitted through a DL-SCH.

In one embodiment, the second information is transmitted through a PDSCH.

In one embodiment, the second information is broadcast.

In one embodiment, the second information is unicast.

In one embodiment, the second information is groupcast.

In one embodiment, the second information indicates a sidelink slot.

In one embodiment, the second information set comprises a bitmap, which is used to indicate a slot reserved for sidelink to all users in a cell.

In one subembodiment of the above embodiment, the bitmap comprises 10 bits.

In one subembodiment of the above embodiment, the bitmap comprises 20 bits.

In one subembodiment of the above embodiment, the bitmap comprises 40 bits.

In one subembodiment of the above embodiment, the bitmap comprises 80 bits.

In one subembodiment of the above embodiment, the bitmap comprises 160 bits.

In one subembodiment of the above embodiment, 1 in the bitmap represents sidelink slot, 0 represents a non-sidelink slot.

In one embodiment, the second information set comprises a Slot Format Indicator (SFI), which is used to indicate a slot format to a group of users or one user.

In one embodiment, the first time resource pool comprises more than 1 sidelink subframe.

In one embodiment, the first time resource pool comprises more than 1 sidelink slot.

In one embodiment, the second candidate slot comprises 14 multicarrier symbols.

In one embodiment, the second candidate slot comprises 12 multicarrier symbols.

In one embodiment, the second candidate slot comprises a search space of an SCI.

In one embodiment, Q is fixed.

In one embodiment, Q is configurable.

In one embodiment, Q is dynamically configured.

In one embodiment, Q is semi-statically configured.

In one embodiment, Q is indicated by the first information set.

In one embodiment, durations of the Q time sub-periods are the same, and positions of the Q candidate times in the Q time sub-periods are the same.

In one embodiment, durations of the Q time sub-periods are the same, and there at least exist positions of two of the Q candidate times in a time sub-period to which they belong being different.

In one embodiment, durations of the Q time sub-periods are the same, and positions of any two of the Q candidate times in a time sub-period to which they belong are different.

In one embodiment, durations of at least two of the Q time sub-periods are different.

In one embodiment, a position of the first candidate time set in the first time period is related to a position of the first time period in the first super time period.

In one embodiment, the first time length is used to determine a duration of each time sub-period in the first time periods, which is a value of the first time length divided by Q.

In one embodiment, the second time resource pool comprises more than one subframe.

In one embodiment, the second time resource pool comprises more than 1 sidelink subframe.

In one embodiment, the second time resource pool comprises more than one slot.

In one embodiment, the second time resource pool comprises more than 1 sidelink slot.

In one embodiment, the second time resource pool comprises more than one slot, and at least one of the more than one slot is a sidelink slot.

In one embodiment, when a slot comprises at least one multicarrier symbol for a sidelink transmission, the slot is a sidelink slot.

In one embodiment, the sidelink slot comprises time-domain resources reserved for a Physical Sidelink Control CHannel (PSCCH).

In one embodiment, the sidelink slot comprises time-domain resources reserved for a Physical Sidelink Shared Channel (PSSCH).

In one embodiment, the sidelink slot comprises time-domain resources reserved for V2X transmission.

In one embodiment, the sidelink slot comprises time-domain resources reserved for Device to Device (D2D) transmission.

In one embodiment, when the subframe comprises at least the sidelink slot, the subframe is a sidelink subframe.

In one embodiment, in each second candidate slot in the second time period, the first node is in a continuous receiving state.

In one embodiment, in each second candidate slot in the second time period, the first node monitors the first-type target signaling in the present application on sidelink.

In one embodiment, the first-type target signaling is monitored in each second candidate slot performing a radio reception in the second resource pool.

In one embodiment, the first-type target signaling is monitored in each second candidate slot performing a sidelink radio reception in the second resource pool.

In one embodiment, the phrase of monitoring the first-type target signaling in each second candidate slot in the second resource pool comprises: executing an energy detection for the first-type target signaling in each second candidate slot in the second time resource pool.

In one embodiment, the phrase of monitoring the first-type target signaling in each second candidate slot in the second resource pool comprises: executing a CRC check for the first-type target signaling in each second candidate slot in the second time resource pool.

In one embodiment, the phrase of monitoring the first-type target signaling in each second candidate slot in the second resource pool comprises: executing a blind decoding for the first-type target signaling in each second candidate slot in the second time resource pool.

In one embodiment, the phrase of monitoring the first-type target signaling in each second candidate slot in the second resource pool comprises: respectively executing a blind decoding on each of multiple RE sets in each second candidate slot in the second time resource pool.

In one embodiment, the phrase of monitoring the first-type target signaling in each second candidate slot in the second resource pool comprises: executing a blind decoding on the first-type target signaling in each a second candidate slot in the second time resource pool, and executing an energy detection on a reference signal of a target radio signal and executing a decoding on the target radio signal; the first-type target signaling is used to indicate time-frequency resources occupied by the target radio signal and an MCS adopted by the target radio signal.

In one embodiment, the phrase of monitoring the first-type target signaling in each second candidate slot in the second resource pool comprises: executing a blind decoding on a PSCCH according to a $1^{st}$ stage SCI format, executing an energy detection on a reference signal of a PSSCH and executing a decoding on the PSSCH in each second candidate slot in the second time resource pool; the $1^{st}$ stage SCI is used to indicate time-frequency resources occupied by the PSSCH and time-frequency resources occupied by the 2nd stage SCI, the PSSCH comprises 2nd stage SCI, and the 2nd stage SCI indicates an MCS of the PSSCH.

In one embodiment, the first-type target signaling is monitored in each second candidate slot in the second resource pool, physical-layer control information is recovered from the first-type target signaling, and if the physical-layer control information does not comprise a first identification component, the first-type target signaling is failed to be detected; if the control information comprises a first identification component, the first-type target signaling is detected.

In one embodiment, the first-type target signaling is monitored in each second candidate slot in the second resource pool, physical-layer control information is recovered from the first-type target signaling, a MAC PDU is recovered from PSSCH decoding, and if the physical-layer control information comprises a first identification component, a sub-header of a MAC PDU does not comprise a second identification component, the first-type target signaling is not detected; if the control information comprises a first identification component, and a sub-header of a MAC PDU comprises a second identification component, the first-type target signaling is detected.

In one embodiment, the first identification component and the second identification component belong to a first link layer identifier.

In one embodiment, the first link layer identifier consists of X bit(s), the first identification component consists of Y1 bit(s), the second identification component consists of Y2 bit(s), X, Y1 and Y2 are respectively positive integers.

In one embodiment, a sum of Y1 plus Y2 is equal to X.

In one embodiment, a sum of Y1 plus Y2 is less than X.

In one embodiment, the X bits consist of the Y1 bit(s) and the Y2 bit(s).

In one embodiment, the Y1 bit(s) and the Y2 bit(s) are respectively Y1 Least Significant Bit(s) and Y2 Most Significant Bit(s) among the X bit(s).

In one embodiment, X, Y1 and Y2 are respectively multiples of 8.

In one embodiment, X, Y1 and Y2 are respectively 24, 16 and 8.

In one embodiment, X, Y1 and Y2 are respectively 24, 8 and 16.

In one embodiment, the first link layer identifier is a Proximity-based Service User Equipment Identifier (Prose UE ID).

In one embodiment, the first link layer identifier is a destination-layer-2 identifier.

In one embodiment, the first link layer identifier is a Prose group ID.

In one embodiment, the first link later identifier is a Prose Layer-2 group ID.

In one embodiment, the first link identifier is generated by ProSe function, and is transferred to the first node U2.

In one embodiment, the first link identifier is generated by a ProSe application server, and is transferred to the first node U2.

In one embodiment, the first link identifier is generated by the first node U2.

Embodiment 7

Embodiment 7 illustrates a schematic diagram of a first super time period and a time period according to one embodiment of the present disclosure, as shown in FIG. 7.

In one embodiment, a duration of each time period in the first super time period is the first time length.

In one embodiment, the first time length is used to determine a duration of each time period in the first super time period.

In one embodiment, durations of at least two time periods in the first super time period are different.

In one embodiment, any two adjacent time periods in the first super time period are discontinuous in time domain.

In one embodiment, at least two adjacent time periods in the first super time period are discontinuous in time domain.

In one embodiment, a time period of the first super time period comprises an ON Duration and an OFF Duration.

In one embodiment, when the first timer is running, the first node is in an ON Duration in a time period.

In one embodiment, when the first timer is running, the first node is in an OFF Duration in a time period.

In case A of embodiment 7, any two adjacent time periods in the first super time period are continuous in time domain, and a duration of each time period in the first super time period is the first time length.

In case B of embodiment 7, any two adjacent time periods in the first super time period are discontinuous in time domain, and a duration of each time period in the first super time period is the first time length

Embodiment 8

Embodiment 8 illustrates a schematic diagram of a second time resource pool, a first time period and a first super time period according to one embodiment of the present disclosure, as shown in FIG. 8.

In one embodiment, a duration of the second time resource pool is equal to the first time length, a second time resource pool is a time period in the first super time period, and the first time period is a time period immediately after the second time resource pool in the first super time period.

In one embodiment, a duration of the second time resource pool is equal to fixed more than the first time length, the second time resource pool is more than one time period in the first super time period, and the first time period is a time period immediately after the second time resource pool in the first super time period.

In case A of embodiment 8, a duration of the second time resource pool is the same as a duration of the first time period, which is the first time length.

In case B of embodiment 8, a duration of the second time resource pool is twice a duration of the first time period.

Embodiment 9

Embodiment 9 illustrates a schematic diagram of a first candidate time set, a first time period, a second time interval and a time sub-period according to one embodiment of the present disclosure, as shown in FIG. 9. In FIG. 9, a forward slash-filled rectangle represents a second time interval in the present application.

In one embodiment, a duration of each time sub-period in the first time period is the same.

In one embodiment, any two adjacent time sub-periods in the first time period are continuous in time domain.

In one embodiment, any two adjacent time sub-periods in the first time period are discontinuous in time domain.

In one embodiment, the first time period comprises Q second time intervals, and the Q second time intervals respectively belong to the Q time sub-periods in the first time period; the Q candidate times in the first candidate time set are respectively start positions of the Q second time intervals in the first time period.

In one embodiment, the first timer starts once in any time sub-period in the first time period.

Embodiment 10

Figures 10, 11:
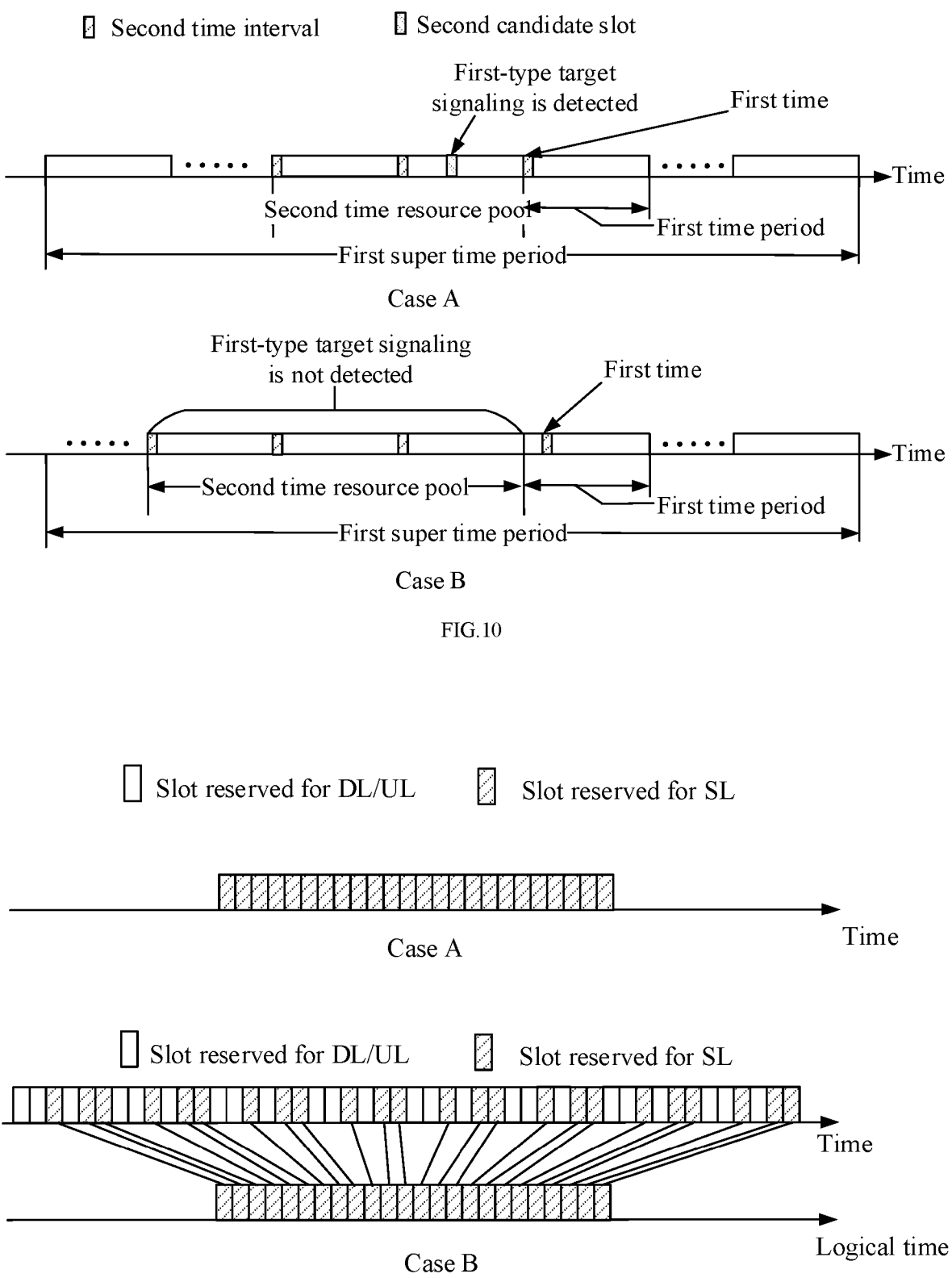
FIG. 10 illustrates a schematic diagram of a first time, a second time resource pool, a second candidate slot and a first time period according to one embodiment of the present application.
FIG. 11 illustrates a schematic diagram of a candidate slot according to one embodiment of the present application.

Embodiment 10 illustrates a schematic diagram of a first time, a second time resource pool, a second candidate slot and a first time period according to one embodiment of the present disclosure, as shown in FIG. 10. In FIG. 10, a forward slash-filled rectangle represents a second time interval in the present application, and a back slash-filled rectangle represents the second candidate slot in the present application.

In one embodiment, a position of the first time in the first time period is related not only to a position of the first time period in the first super time period but also to a result of the monitoring behavior of the first processor in the second time resource pool.

In one subembodiment of the above embodiment, when the first processor does not detect the first-type target signaling in the second time resource pool, a position of the first time in the first time period is different from a position of the second time in the second time resource pool; when the first processor detects the first-type target signaling in the second time resource pool, a position of the first time in the first time period is the same as a position of the second time in the second time resource pool.

In one subembodiment of the above embodiment, the first processor detects the first-type target signaling for the first time in any time period in the second time resource pool, and the time period is a latest time period in the second time resource pool.

In one embodiment, a position of the second time in the second time resource pool is one of K positions, an index of the second time in the second time resource pool in x, where $0 \leq x \leq K-1$, the first processor does not detect the first-type target signaling in the second time resource pool, and a position of the first time in the first time period is a position indexed as mod $(x+1, K)$ among K positions, where mod (.) is a complementation.

In one embodiment, a position of the second time in the second time resource pool is one of K positions, an index of the second time in the second time resource pool in x, where $0 \leq x \leq K-1$, the first processor does not detect the first-type target signaling in the second time resource pool, and a position of the first time in the first time period is a position indexed as $K-1-x$ among K positions.

In one embodiment, a position of the second time in the second time resource pool is one of K positions, an index of the second time in the second time resource pool in x, where $0 \leq x \leq K-1$, the first processor does not detect the first-type target signaling in the second time resource pool, and an index of a position of the first time in the first time period is determined by an index of the first time period in the first super time period.

In one embodiment, a position of the second time in the second time resource pool is one of two positions, an index of a position of the second time in the second time resource pool is a first position, the first processor does not detect the first-type target signaling in the second time resource pool, and a position of the first time in the first time period is a second position.

In one embodiment, a position of the second time in multiple time periods in the second time resource pool is the same.

In one embodiment, a duration of the second time resource pool is not greater than a product value of the first threshold and the first time length.

In one embodiment, a duration of the second time resource pool is determined by a value of the first counter.

In one embodiment, a duration of the second time resource pool is a product value of a value of the first counter plus 1 and the first time length before the first counter stops.

In one embodiment, a duration of the second time resource pool is a time between two adjacent stops of the first counter.

In one embodiment, a position of the first time in the first time period is related not only to a position of the first time period in the first super time period but also related to a result of the monitoring behavior of the first processor in a latest time period in the second time resource pool.

In one embodiment, when a value of the first counter is increased by 1 in a time period to reach the first threshold value, the time period is a latest time period in the second time resource pool.

In one embodiment, when the first-type target signaling is detected for the first time in a second candidate slot in a time period, the time period is a latest time period in the second time resource pool.

In case A of embodiment 10, a latest time period in the second time resource pool is a time period where a second candidate slot of the first-type target signaling is detected for the first time, as shown in case A of FIG. 10, a latest time period in the second time resource pool is a second time period in the second time resource pool; a position of the second time in the second time resource pool is a position with an index of 0 among K positions, a position of the first time in the first time period is the same as a position of the second time in the second time resource pool, which is a position indexed as 0 among K positions.

In case B of embodiment 9, a latest time period in the second time resource pool is a time period when a value of the first counter increased by 1 in a time period reaches the first threshold, as shown in case B of FIG. 10, the first threshold is set to 3, and a latest time period in the second time resource pool is a third time period in the second time resource pool; a position of the second time in the second time resource pool is a position with an index of 0 among K positions, a position of the first time in the first time period is different from a position of the second time in the second time resource pool, which is a position indexed as 1 among K positions.

Embodiment 11

Embodiment 11 illustrates a schematic diagram of a candidate slot according to one embodiment of the present disclosure, as shown in FIG. 11. In FIG. 11, the rectangle without filling indicates a slot reserved for DL/UL, and the forward slash-filled rectangle indicates a slot reserved for SL.

In one embodiment, the time period comprises a candidate slot, and the candidate slot is the first candidate slot.

In one embodiment, the second time resource pool comprises a candidate slot, and the candidate slot is the second candidate slot.

In case A of embodiment 11, the candidate slot is continuous in time domain.

In case B of embodiment 11, the candidate slot is continuous in logical time domain, and the logical time domain comprises time-domain resources reserved for sidelink.

In one embodiment, when the slot is reserved for sidelink, the slot is a candidate slot.

In one embodiment, when partial or all multicarrier symbols of the slot is reserved for sidelink, the slot is a candidate slot.

In one embodiment, when the slot is reserved for sidelink and is not used by the first node for transmitting a Physical Sidelink Shared Channel (PSSCH), the slot is a candidate slot.

In one embodiment, when the slot is reserved for sidelink and is not used by the first node for transmitting a Physical Sidelink Control Channel (PSCCH), the slot is a candidate slot.

In one embodiment, when the slot is configured as search space of the first node, the slot is a candidate slot.

In one embodiment, the candidate slot belongs to a D2D time-frequency resource pool.

In one embodiment, the candidate slot belongs to a V2V time-frequency resource pool.

In one embodiment, the candidate slot belongs to a same V2V time-frequency resource pool.

Embodiment 12

Embodiment 12 illustrates a schematic diagram of a first time and a second time interval according to one embodiment of the present application, as shown in FIG. 12. In FIG. 12, the rectangle without filling indicates a multicarrier reserved for DL/UL, and the forward slash-filled rectangle indicates a multicarrier reserved for SL.

In one embodiment, the first time is a start time of the second time interval in the first time period.

In one embodiment, when the first time period comprises Q time sub-periods, the first time is a start time of the second time interval among the Q time sub-periods comprised in the first time period.

In one embodiment, the second time is a start time of the second time interval among the multiple time periods in the second time resource pool.

In one embodiment, the second time interval is a slot, and a length of the slot is related to a frequency-domain subcarrier spacing.

In one embodiment, the second time interval is a candidate slot, and a length of the candidate slot is related to a frequency-domain subcarrier spacing.

In one embodiment, the second time interval is a first multicarrier symbol reserved for SL in a slot.

In one embodiment, the second time interval is a first multicarrier symbol reserved for SL in a candidate slot.

In one embodiment, the second time interval comprises 14 multicarrier symbols.

In one embodiment, the second time interval comprises 12 multicarrier symbols.

In one embodiment, the second time interval comprises 1 multicarrier symbol.

In case A of embodiment 12, the second time interval is a second one of a second candidate slot in the second time resource pool, and the second time interval is a third one of a first candidate slot in the first time period.

In case B of embodiment 12, the second time interval is a third multicarrier symbol in a second one of a second candidate slot in the second time resource pool, and the second time interval is a third multicarrier symbol in a third one of a first candidate slot in the first time period.

Embodiment 13

Embodiment 13 illustrates a schematic diagram of K possible positions of a first time and a first time period according to one embodiment of the present disclosure, as shown in FIG. 13.

In one embodiment, a position of the first time in the first time period is one of K positions, and any two of the K positions do not belong to a same slot.

In one embodiment, a position of the first time in the first time period is one of K positions, and any two of the K positions do not belong to a same candidate slot.

In one embodiment, there are K the first time periods in the first super time period, when an index of the first time period in the first super time period is 0, a position of the first time in the first time period is a position indexed as 0 among K positions, as a first position in case A of embodiment 13.

In one embodiment, the first super time period has L the first time periods, when a remainder of an index of the first time period in the first super time period divided by K is 0, as K=5, an index of the first time period in the first super time period is 10, and a position of the first time in the first time period is a position indexed as 0 among K positions, as a first position in case A of embodiment 13.

In one embodiment, there are L the first time periods in the first super time period, where L is an odd number, when an index of the first time period in the first super time period is an odd number of 1, 3, 5, . . . , L, a position of the first time in the first time period is a first position, that is, a first position in case B of embodiment 13; when an index of the first time period in the first super time period is an even number of 0, 2, 4, . . . , L−1, a position of the first time in the first time period is a second position, as a second position in case B of embodiment 13.

In one embodiment, there are L the first time periods in the first super time period, where L is an even number, when an index of the first time period in the first super time period is an odd number of 1, 3, 5, . . . , L, a position of the first time in the first time period is a first position, that is, a first position in case B of embodiment 13; when an index of the first time period in the first super time period is an even number of 0, 2, L, a position of the first time in the first time period is a second position, as a second position in case B of embodiment 13.

In one embodiment, a time passing the first expiration value from any of K positions in the first time period is not later than an end time of the first time period.

In one embodiment, a time lasting from the first time to an end time of the first time period is equal to the first expiration value.

In one embodiment, a time lasting from the first time to an end time of the first time period is greater than the first expiration value.

In one embodiment, an end time of the first time period is an end time of a latest slot comprised in the first time period.

In one embodiment, an end time of the first time period is an end time of a latest multicarrier symbol comprised in the first time period.

Embodiment 14

Figure 14:
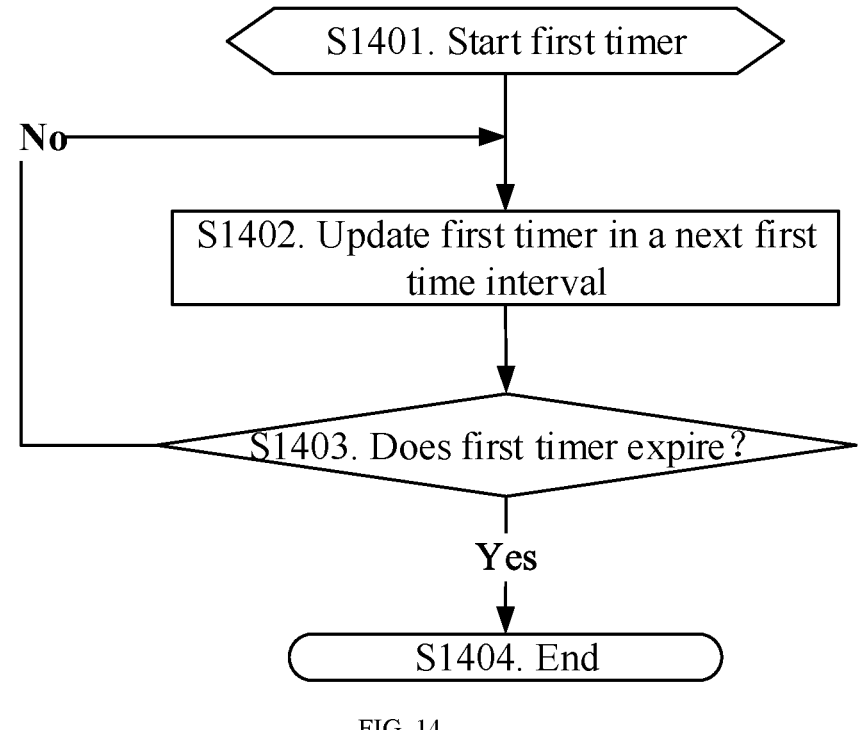
FIG. 14 illustrates a flowchart of utilizing a first timer according to one embodiment of the present application.

Embodiment 14 illustrates a flowchart of utilizing a first timer according to one embodiment of the present disclosure, as shown in FIG. 14. Steps in FIG. 14 are performed in a first node.

Start first timer in step S1401; in step S1402, update a first timer in a next first timer interval; judge whether a first timer expires in step S1403, if yes, end, if no, return to step S1402.

In one embodiment, the first timer is maintained on the MAC layer.

In one embodiment, the first timer is maintained by a MAC entity.

In one embodiment, the first timer is a drx-onDuration-Timer.

In one embodiment, the first timer is a drx-onDuration-TimerSL.

In one embodiment, when the first timer is running, the first timer is updated in each first time interval in the present disclosure.

In one embodiment, when the first timer is in a non-running state, a monitoring of the first-type target signaling is stopped to be executed in each first candidate slot in the first time period.

In one embodiment, when the first timer is in a non-running state, a monitoring of the first-type target signaling is stopped to be executed in each second candidate slot in the second time period.

In one embodiment, when the first timer is in a non-running state, an updating of the first timer is stopped each first time interval.

In one embodiment, the first time interval comprises a subframe.

In one embodiment, the first time interval comprises a slot, and a length of the slot is related to a frequency-domain subcarrier spacing.

In one embodiment, the first time interval comprises the first candidate slot, and a length of the first candidate slot is related to a frequency-domain subcarrier spacing.

In one embodiment, the first time interval comprises the second candidate slot, and a length of the second candidate slot is related to a frequency-domain subcarrier spacing.

In one embodiment, the first time interval comprises 14 multicarrier symbols.

In one embodiment, the first time interval comprises 12 multicarrier symbols.

In one embodiment, the first time interval is 1 ms.

In one embodiment, the first time interval is $\frac{1}{32}$ ms.

In one embodiment, the first expiration value of the first timer can be M ms, M being a positive integer, such as the first expiration value can be 5 ms.

In one embodiment, the first expiration value of the first timer can be N, N being a positive integer from 1 to 31 (comprising 1 and 31).

In one embodiment, the first expiration value of the first timer divided by the first time interval is a second expiration value; if the first expiration value of the first timer is 5 ms, the first time interval comprises a slot, a length of the slot is determined as 0.5 ms according to a 30K SCS, then the second expiration value is 5/0.5=10.

In one embodiment, an initial value of the first timer is 0, and the phrase of updating the first timer is increasing a value of the first timer by 1; when a value of the first timer is the second expiration value of the first timer, the first timer is stopped.

In one embodiment, an initial value of the first timer is the second expiration value of the first timer, and the phrase of updating the first timer is decreasing a value of the first timer by 1; when a value of the first timer is 0, the first timer is stopped.

In one embodiment, the phrase that the first timer is running comprises: states of the first timer after being started and before being stopped.

In one embodiment, when the first timer is running, the first node is in a continuous receiving state.

In one embodiment, when the first timer is running, the first node monitors the first-type target signaling in all D2D resource pools.

In one embodiment, when the first timer is running, the first node monitors the first-type target signaling in all V2X resource pools.

In one embodiment, when the first timer is running, the first node monitors DCI in all downlink slots.

In one embodiment, when the first time interval is the first candidate slot, the next time interval is an upcoming first candidate slot.

In one embodiment, when the first time interval is the second candidate slot, the next time interval is an upcoming second candidate slot.

In one embodiment, when the first time interval is the first candidate slot, the next time interval is an upcoming first candidate slot reserved for V2X.

In one embodiment, when the first time interval is the second candidate slot, the next time interval is an upcoming second candidate slot reserved for V2X.

In one embodiment, when the first time interval is the first candidate slot, the next time interval is the upcoming first candidate slot reserved for a same V2X resource pool.

In one embodiment, when the first time interval is the second candidate slot, a next time interval is the upcoming second candidate slot reserved for a same V2X resource pool.

Embodiment 15

Figure 15:
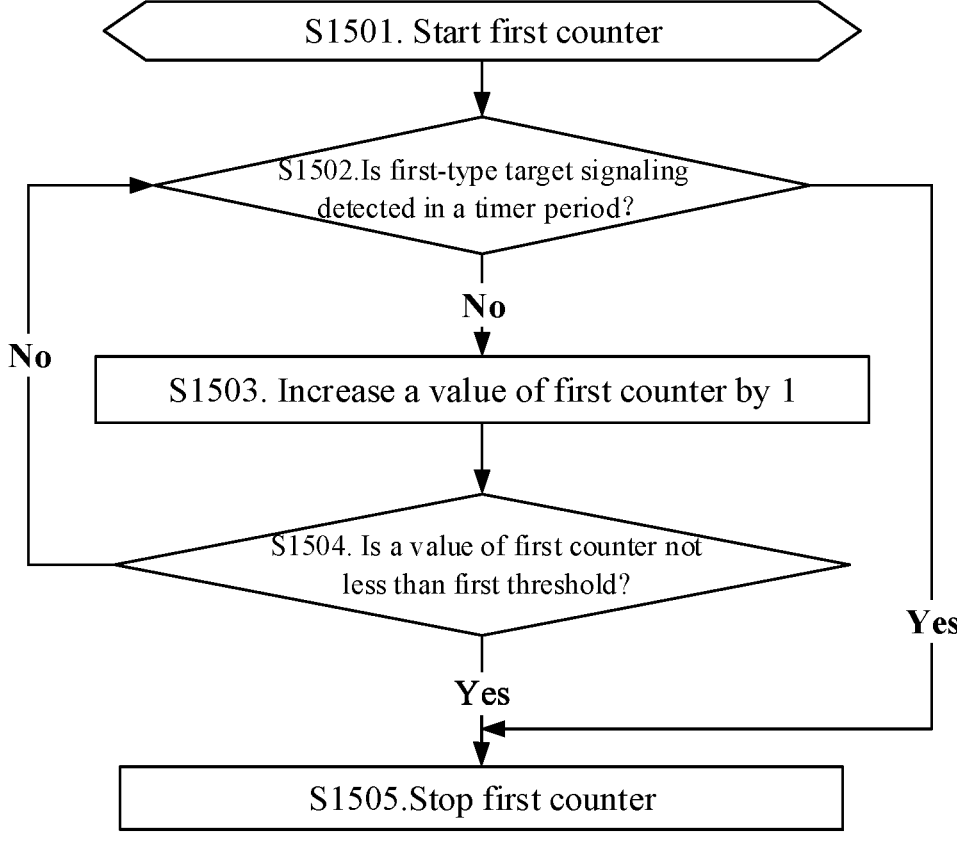
FIG. 15 illustrates a flowchart of utilizing a first counter according to one embodiment of the present application.

Embodiment 15 illustrates a flowchart of utilizing a first counter according to one embodiment of the present disclosure, as shown in FIG. 15. Steps in embodiment 15 are performed in a first node.

Start a first counter in step S1501; judge whether a first-type target signaling is detected in a time period in step S1502, and if it is detected, jump to step S1505 to stop a first counter, and if it is not detected, continue the step S1503; increase a value of a first counter by 1 in step S1503; judge whether a value of a first counter is not greater than the first threshold in step S1504, if yes, execute step S1504 to stop a first counter, and if no, jump to step S1502.

In one embodiment, the first-type target signaling is detected for a first time in the second time resource pool, and a second candidate slot of the first-type target signaling is detected to belong to the time period, the time period is a latest time period in the second time resource pool, and the first counter is stopped in the time period.

In one embodiment, when the first-type target signaling is detected in a second candidate slot in the time period in the second time resource pool, the first counter is stopped in the time period.

In one embodiment, when the first-type target signaling is detected in multiple second candidate slots in the time period in the second time resource pool, the first counter is stopped in the time period.

In one embodiment, the first timer is stopped at an end time of the time period.

In one embodiment, when the first-type target signaling is not detected in the time period, a value of the first counter is increased by 1 at an end time of the time period.

In one embodiment, an end time of the time period is an end time of a latest slot comprised in the time period.

In one embodiment, an end time of the time period is an end time of a latest multicarrier symbol comprised in the time period.

In one embodiment, the phrase of starting a first counter comprises resetting a value of the counter.

In one embodiment, the phrase of starting a first counter comprises setting a value of the counter to 0.

In one embodiment, the phrase of starting a first counter comprises setting a value of the counter to any random positive integer.

In one embodiment, the phrase of stopping the first counter comprises resetting a value of the counter.

In one embodiment, the phrase of stopping the first counter comprises setting a value of the counter to 0.

In one embodiment, the phrase of stopping the first counter comprises setting a value of the counter to any random positive integer.

In one embodiment, the phrase of the first counter being in a counting state comprises: a state of the first counter after being started and before being stopped.

In one embodiment, the phrase of the first counter being in a counting state comprises: a state of the first counter between two continuous resets.

Embodiment 16

Figures 16, 17:
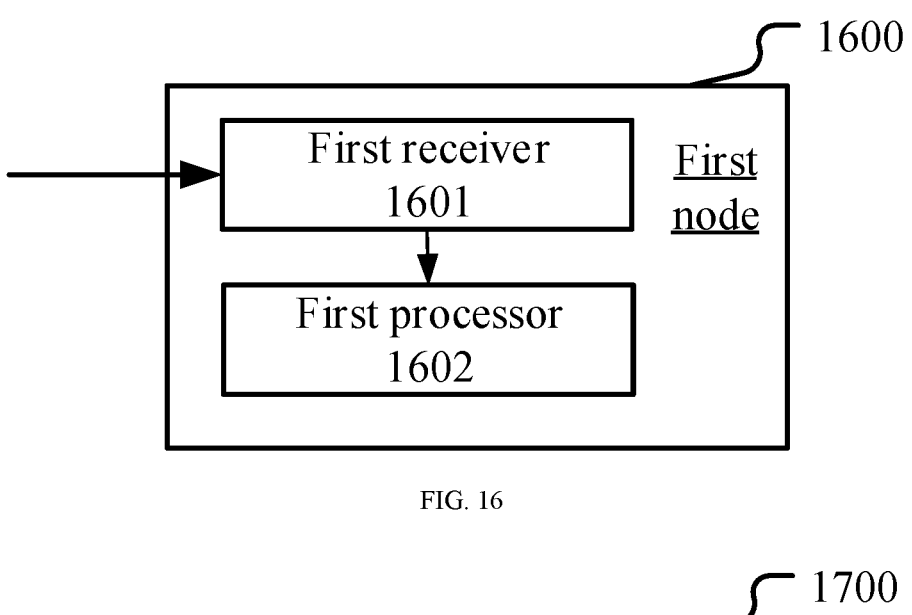
FIG. 16 illustrates a structure block diagram of a processor in a first node according to one embodiment of the present application.
FIG. 17 illustrates a structure block diagram of a processor in second node according to one embodiment of the present application.

Embodiment 16 illustrates a structure block diagram of a processor in a first node according to one embodiment of the present disclosure, as shown in FIG. 16. In FIG. 16, a processor 1600 of a first node comprises a first receiver 1601 and a first processor 1602. The first receiver 1601 comprises the transmitter/receiver 456 (comprising the antenna 460), the receiving processor 452 and the controller/processor 490 in FIG. 4 of the present disclosure; the first processor 1602 comprises the controller/processor 490 in FIG. 4 of the present application.

In embodiment 16, a first receiver 1601 receives first information, receives a first information set, and the first information set indicates a first time length and a first expiration value; the first processor 1602 starts a first timer at a first time in a first time period when the first timer is running, updates the first timer in each first time interval in the first time period and monitors a first-type target signaling in each first candidate slot in the first time period; when the first timer expires, stops the first timer; herein, the first time period is a time period in a first super time period, and the first super time period comprises multiple time periods; a position of the first time in the first time period is related to a position of the first time period in the first super time period; the first expiration value is used to determine an expiration of the first timer.

In one embodiment, the first processor 1602 starts the first timer at a second time in a second time resource pool; when the first timer is running, updates the first timer in each of the first time interval in the second time resource pool and monitors the first-type target signaling in each second candidate slot in the second time resource pool; when the first timer expires, stops the first timer; herein, the second time resource pool is within the first super time period and before the first time period, a position of the first time in the first time period is related to a result of the monitoring behavior of the first processor 1602 in the second time resource pool.

In one embodiment, the first time is any candidate time in a first candidate time set, the first candidate time set comprises Q candidate times; the first time period comprises Q time sub-periods, the Q candidate times in the first candidate time set respectively belong to the Q time sub-periods in the first time period; herein, Q is a positive integer greater than 1.

In one embodiment, the first processor 1602 starts the first timer at a second time in a second time resource pool; when the first timer is running, updating the first timer in each first time interval in the second time resource pool and monitoring the first-type target signaling in each second candidate slot in the second time resource pool; when the first timer expires, stops the first timer; herein, the second time resource pool is within the first super time period and before the first time period, a position of the first time in the first time period is related to a result of the monitoring behavior of the first processor 1602 in the second time resource pool; the first processor 1702 starts a first counter; when the first-type target signaling is not detected in each time period and the first counter is counting, adds 1 to a value of a first counter; the first-type target signaling is detected in any time period, stops the first timer; when a value of the first counter is not less than a first threshold, stops the first counter; herein, the second time resource pool comprises at least one time period; when the first counter is counting in a second candidate slot, the second candidate slot belongs to the second time resource pool, and the first information set indicates the first threshold.

In one embodiment, the first receiver 1602 receives a second information set, the second information set indicates a first time resource pool; herein, each first candidate slot belongs to the first time resource pool.

Embodiment 17

Embodiment 17 illustrates a structure block diagram of a processor in a second node according to one embodiment of the present disclosure, as shown in FIG. 17. In FIG. 17, a processor 1700 in a second node comprises a first transmitter 1701. The first transmitter 1701 comprises the transmitter/receiver 416 (comprising the antenna 420), the transmitting processor 415 and the controller/processor 440 in FIG. 4 of the present disclosure.

In embodiment 17, the first transmitter 1701 transmits a first information set, and the first information set indicates a first time length and a first expiration value; a first timer is started at a first time in a first time period; when the first timer is running, the first timer is updated in each first time interval in the first time period and a first-type target signaling is monitored in each first candidate slot in the first time period; when the first timer expires, the first timer is stopped; herein, the first time period is a time period in a first super time period, and the first super time period comprises multiple time periods; a position of the first time in the first time period is related to a position of the first time period in the first super time period; the first expiration value is used to determine an expiration of the first timer.

In one embodiment, the first timer starts timing at a second time in a second time resource pool; when the first timer is running, the first timer is updated in each first time interval in the second time resource pool and the first-type target signaling is monitored in each of the second candidate slot in the second time resource pool; when the first timer expires, the first timer is stopped; herein, the second time resource pool is within the first super time period and before the first time period, a position of the first time in the first time period is related to a result of the monitoring behavior of the first processor in the second time resource pool.

In one embodiment, the first time is any candidate time in a first candidate time set, the first candidate time set comprises Q candidate times; the first time period comprises Q time sub-periods, the Q candidate times in the first candidate time set respectively belong to the Q time sub-periods in the first time period; herein, Q is a positive integer greater than 1.

In one embodiment, the first timer starts timing at a second time in a second time resource pool; when the first timer is running, the first timer is updated in each of the first time interval in the second time resource pool and the first-type target signaling is monitored in each of the second candidate slot in the second time resource pool; when the first timer expires, the first timer is stopped; herein, the second time resource pool is within the first super time period and before the first time period, a position of the first time in the first time period is related to a result of the monitoring behavior of the first processor in the second time resource pool; a first counter is started; when the first-type target signaling is not detected in each time period and the first counter is counting, a value of the first counter is added by 1; the first-type target signaling is detected in any time period, the first timer is stopped; when a value of the first counter is not less than a first threshold, the first counter is stopped; herein, the second time resource pool comprises at least one time period; when the first counter is counting in a second candidate slot, the second candidate slot belongs to the second time resource pool, and the first information set indicates the first threshold.

In one embodiment, the first transmitter 1701 transmits a second information set, the second information set indicates a first time resource pool; herein, each first candidate slot belongs to the first time resource pool.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. A first-type communication node or a UE or a terminal in the present disclosure includes but not limited to mobile phones, tablet computers, laptops, network cards, low-power devices, enhanced Machine Type Communication (eMTC) devices, NB-IOT devices, vehicle-mounted communication equipments, aircrafts, airplanes, unmanned aerial vehicles (UAV), telecontrolled aircrafts and other wireless communication devices. The second-type communication node or the base station or the network side device in the present disclosure includes but is not limited to the macro-cellular base stations, micro-cellular base stations, home base stations, relay base stations, eNB, gNB, Transmission and Reception Points (TRP), relay satellites, satellite base stations, air base stations and other wireless communication equipment.

The above are merely the preferred embodiments of the present application and are not intended to limit the scope of protection of the present application. Any modification, equivalent substitute and improvement made within the spirit and principle of the present application are intended to be included within the scope of protection of the present application.

What is claimed is:

1. A user equipment (UE) for wireless communications, the UE comprising:

a transceiver; and a processor, wherein the transceiver and the processor are configured to:

receive a first information set indicative of a time length and an expiration value;

receive a second information set indicative of a plurality of candidate slots;

select a time period from a plurality of time periods in a super time period, wherein a duration of the selected time period is equal to the time length;

determine a position of the selected time period in the super time period;

select, based on the position, a first time in the selected time period;

start a timer at the first time;

while the timer is running, update the timer in each first time interval of a plurality of time intervals in a first time resource pool in the selected time period, and monitor a target signaling in each candidate slot of the plurality of candidate slots in the first time resource pool in the selected time period;

determine, based on the expiration value, an expiration of the timer; and on a condition that the timer expires, stop the timer.

2. The UE according to claim 1, wherein the transceiver and the processor are further configured to:

select a second time;

start the timer at the second time in a second time resource pool;

while the timer is running, update the timer in each time interval of the plurality of time intervals in the second time resource pool, and monitor the type target signaling in each candidate slot of the plurality of candidate slots in the second time resource pool in the super time period and before the selected time period;

on a condition that the timer expires, stop the timer; and determining, based on a result of the monitoring in the second time resource pool, a position of the first time in the first selected time period.

3. The UE according to claim 2, wherein the transceiver and the processor are further configured to:

starting a counter;

on a condition that the target signaling is not detected in the selected time period and the counter is counting, add 1 to a value of a counter;

on a condition that the target signaling is detected in the selected time period, stop the timer;

on a condition that the value of the counter is not less than a threshold, stopping the counter, wherein the first information set is further indicative of the threshold; and wherein the counter counts in a second candidate slot of the plurality of candidate slots in the second time resource pool.

4. The UE according to claim 1, wherein the first time is a candidate time in a first candidate time set, the first candidate time set comprises a plurality of candidate times; the selected time period comprises a plurality of time sub-periods, the plurality of candidate times in the first candidate time set respectively belong to the plurality of time sub-periods in the selected time period.

5. A base station for wireless communications, the base station comprising:

a transceiver; and a processor, wherein the transceiver and the processor are configured to:

transmit a first information set, indicative of a time length and an expiration value;

wherein a timer is started at a first time in a first time period; and wherein on a condition that the timer is running, the timer is updated in each first time interval in the first time period and a target signaling is monitored in each first candidate slot in the first time period; and wherein on a condition that the timer expires, the timer is stopped; and wherein a duration of the first time period is equal to the time length, the first time period is a time period in a super time period, and the super time period comprises multiple time periods; and wherein a position of the first time in the first time period is associated with a position of the first time period in the super time period; and wherein the first expiration value is used to determine an expiration of the timer.

6. The base station according to claim 5, wherein the timer is started at a second time in a second time resource pool; and wherein while the timer is running, the timer is updated in each of the first time interval in the second time resource pool and the target signaling is monitored in each candidate slot in the second time resource pool; and wherein on a condition that the timer expires, the timer is stopped; and wherein the second time resource pool is within the super time period and before the first time period, a position of the first time in the first time period is related to a result of the monitoring behavior in the second time resource pool.

7. The base station according to claim 6, wherein a counter is started; and wherein on a condition that the target signaling is not detected in each time period and the counter is counting, a value of the counter is added by 1; and wherein on a condition that the target signaling is detected in any time period, the timer is stopped; and wherein on a condition that a value of the counter is not less than a first threshold, the counter is stopped; and wherein the second time resource pool comprises at least one time period; and wherein the counter counts in a second candidate slot, the second candidate slot belongs to the second time resource pool, and the first information set indicates the first threshold.

8. The base station according to claim 5, wherein the first time is any candidate time in a first candidate time set, the first candidate time set comprises a plurality of candidate times; the first time period comprises a plurality of time sub-periods, the plurality of candidate times in the first candidate time set respectively belong to the plurality of time sub-periods in the first time period.

9. The base station according to claim 5, wherein the transceiver and the processor are further configured to:

transmit a second information set indicative of a first time resource pool; and wherein each first candidate slot belongs to the first time resource pool.

10. A method in a user equipment (UE) for wireless communications, the method comprising:

receiving a first information set indicative of a time length and an expiration value;

receiving a second information set indicative of a plurality of candidate slots;

selecting a time period from a plurality of time periods in a super time period, wherein a duration of the selected time period is equal to the time length;

determining a position of the selected time period in the super time period;

selecting, based on the position, a first time in the selected time period;

starting a timer at the first time;

while the timer is running, updating the timer in each time interval of a plurality of time intervals in a first time resource pool in the selected time period, and monitoring a target signaling in each candidate slot of the plurality of candidate slots in the first time resource pool in the first selected time period;

determining, based on the expiration value, an expiration of the timer; and on a condition that the timer expires, stopping the timer.

11. The method in the UE according to claim 10, further comprising:

selecting a second time;

starting the timer at the second time in a second time resource pool;

while the timer is running, updating the timer in each time interval of the plurality of time intervals in the second time resource pool, and monitoring the target signaling in each candidate slot of the plurality of candidate slots in the second time resource pool in the super time period and before the selected time period;

on a condition that the timer expires, stopping the timer; and determining, based on a result of the monitoring in the second time resource pool, a position of the first time in the selected time period.

12. The method in the UE according to claim 11, further comprising:

starting a counter;

on a condition that the target signaling is not detected in the selected time period and the counter is counting, adding 1 to a value of the counter;

on a condition that the target signaling is detected in the selected time period, stopping the timer;

on a condition that the value of the counter is not less than a threshold, stopping the counter, wherein the first information set is further indicative of the threshold; and wherein the counter counts in a second candidate slot of the plurality of candidate slots in the second time resource pool.

13. The method in the UE according to claim 10, wherein the first time is any candidate time in a first candidate time set, the first candidate time set comprises a plurality of candidate times; the selected time period comprises a plurality of time sub-periods, the plurality of candidate times in the first candidate time set respectively belong to the plurality of time sub-periods in the selected time period.

14. A method in a base station for wireless communications, comprising:

transmitting a first information set indicative of a time length and an expiration value;

wherein a timer is started at a first time in a first time period; and wherein on a condition that the timer is running, the timer is updated in each first time interval in the first time period and a target signaling is monitored in each first candidate slot in the first time period; and wherein on a condition that the timer expires, the timer is stopped; and wherein a duration of the first time period is equal to the time length, the first time period is a time period in a super time period, and the super time period comprises multiple time periods; and wherein a position of the first time in the first time period is associated with a position of the first time period in the super time period; and wherein the expiration value is used to determine an expiration of the timer.

15. The method in a base station according to claim 14, wherein the timer is started at a second time in a second time resource pool; and wherein while the timer is running, the timer is updated in each of the first time interval in the second time resource pool and the target signaling is monitored in each candidate slot in the second time resource pool; and wherein on a condition that the timer expires, the timer is stopped; and wherein the second time resource pool is within the super time period and before the first time period, a position of the first time in the first time period is related to a result of the monitoring behavior in the second time resource pool.

16. The method in a base station according to claim 15, wherein a counter is started; and on a condition that the target signaling is not detected in each time period and the counter is counting, a value of the counter is added by 1; and wherein on a condition that the target signaling is detected in any time period, the timer is stopped; and wherein on a condition that a value of the counter is not less than a first threshold, the counter is stopped; and wherein the second time resource pool comprises at least one time period; and wherein the counter counts in a second candidate slot, the second candidate slot belongs to the second time resource pool, and the first information set indicates the first threshold.

17. The method in a base station according to claim 14, wherein the first time is any candidate time in a first candidate time set, the first candidate time set comprises a plurality of candidate times; the first time period comprises a plurality of time sub-periods, the plurality of candidate times in the first candidate time set respectively belong to the plurality of time sub-periods in the first time period.

18. The method in a base station according to claim 14, further comprising:

transmitting a second information set indicative of a first time resource pool; and wherein each first candidate slot belongs to the first time resource pool.

* * * * *